(12) United States Patent
Gila et al.

(10) Patent No.: US 9,846,493 B2
(45) Date of Patent: Dec. 19, 2017

(54) SYSTEMS AND METHODS FOR WRITING ON AND USING ELECTRONIC PAPER

(71) Applicant: Hewlett-Packard Development Company, L.P., Houston, TX (US)

(72) Inventors: Omer Gila, Palo Alto, CA (US); Napoleon J Leoni, Palo Alto, CA (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 501 days.

(21) Appl. No.: 14/219,725

(22) Filed: Mar. 19, 2014

(65) Prior Publication Data

US 2014/0240299 A1    Aug. 28, 2014

Related U.S. Application Data

(63) Continuation-in-part of application No. 12/792,301, filed on Jun. 2, 2010.

(51) Int. Cl.
    *G02F 1/167*    (2006.01)
    *G06F 3/0354*    (2013.01)
    *B41J 3/407*    (2006.01)

(52) U.S. Cl.
    CPC ........ *G06F 3/03545* (2013.01); *B41J 3/4076* (2013.01)

(58) Field of Classification Search
    CPC ...... G09G 3/344; G09G 3/3433; G09G 3/348; G09G 3/3446; G02B 26/004; G02B 26/005
    USPC ............ 345/156, 179, 107; 178/19.01–19.04
    See application file for complete search history.

(56) References Cited

U.S. PATENT DOCUMENTS

| | | | |
|---|---|---|---|
| 6,222,513 B1 | 4/2001 | Howard | |
| 6,407,763 B1 | 6/2002 | Yamaguchi et al. | |
| 6,424,387 B2 | 7/2002 | Sato | |
| 6,456,272 B1 | 9/2002 | Howard | |
| 6,515,790 B2* | 2/2003 | Miyamoto | G02F 1/167 345/107 |
| 6,573,880 B1 | 6/2003 | Simoni | |
| 6,768,889 B2* | 7/2004 | Ikegawa | G02F 1/133348 399/130 |
| 6,795,228 B2 | 9/2004 | Sacripante | |
| 7,265,894 B2 | 9/2007 | Schmitz | |
| 8,144,388 B2 | 3/2012 | Ogawa | |
| 8,389,381 B2 | 3/2013 | Amundson et al. | |
| 8,493,319 B2 | 7/2013 | Gila et al. | |
| 8,830,160 B2 | 9/2014 | Gila et al. | |
| 2001/0020935 A1 | 9/2001 | Gelbman | |
| 2004/0263470 A1 | 12/2004 | Sprague | |
| 2005/0134550 A1 | 6/2005 | Schmitz | |
| 2005/0247797 A1 | 11/2005 | Ramachandran | |

(Continued)

*Primary Examiner* — Ram Mistry
(74) *Attorney, Agent, or Firm* — HP Inc. Patent Department

(57) ABSTRACT

Example systems and methods for writing on electronic paper ("e-paper") are described. In one example, a system for writing information on electronic paper includes a writing module comprising an array of electrodes. The writing module is configured to selectively operate one or more electrodes in the array of electrodes to write information on the electronic paper. The system also includes a compliant mechanism coupled to the writing module to establish contact between the writing module and the electronic paper.

12 Claims, 19 Drawing Sheets

(56) References Cited

U.S. PATENT DOCUMENTS

| | | |
|---|---|---|
| 2006/0017659 A1 | 1/2006 | Ogawa |
| 2006/0125778 A1 | 6/2006 | Apte |
| 2007/0061214 A1 | 3/2007 | Schmitz |
| 2007/0176973 A1 | 8/2007 | Hisanobu |
| 2008/0186259 A1 | 8/2008 | Todorokihara |
| 2008/0292978 A1 | 11/2008 | Lin |
| 2010/0060628 A1 | 3/2010 | Lenssen |
| 2012/0274620 A1 | 11/2012 | Hwang |
| 2014/0240299 A1* | 8/2014 | Gila .................... G06F 3/03545 345/179 |

\* cited by examiner

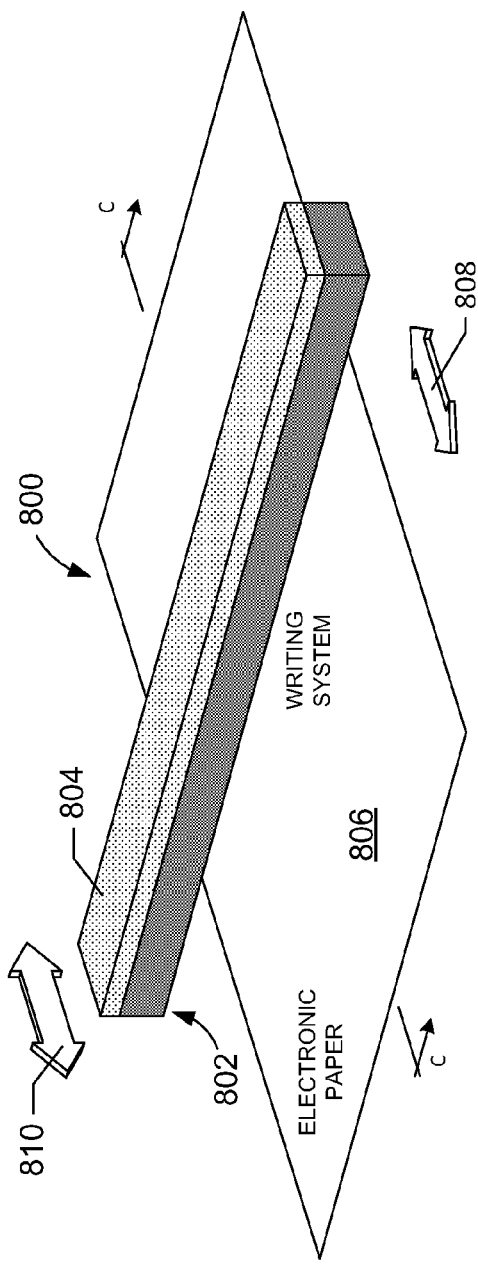
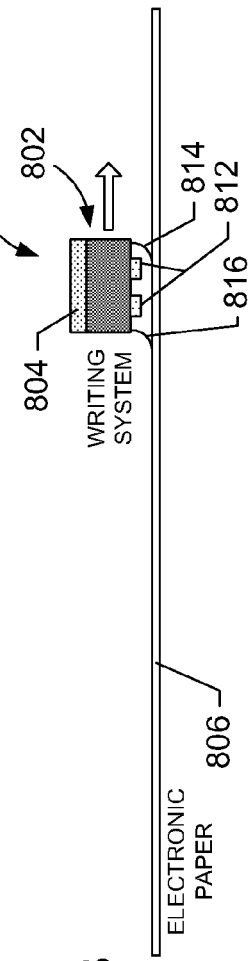
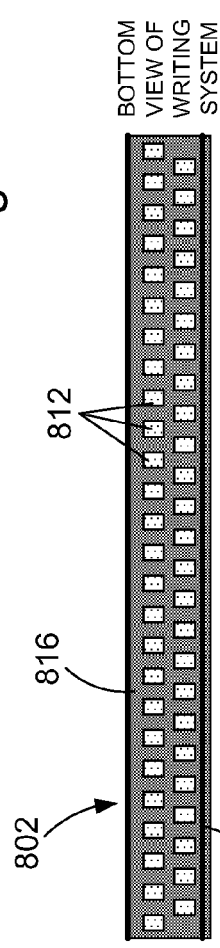
Fig. 8A
Fig. 8B
Fig. 8C

SYSTEMS AND METHODS FOR WRITING ON AND USING ELECTRONIC PAPER

CROSS REFERENCE TO RELATED APPLICATIONS

The present application is a continuation-in-part and claims the priority under 35 U.S.C §120 of prior U.S. patent application Ser. No. 12/792,301, titled "Systems and Methods for Writing on and Using Electronic Paper," filed Jun. 2, 2010. The application is incorporated by reference in its entirety.

TECHNICAL FIELD

Embodiments of the present invention relate to electronic paper.

BACKGROUND

Electronic paper ("e-paper") is a display technology designed to recreate the appearance of ink on ordinary paper. E-paper reflects light like ordinary paper and may be capable of displaying text and images indefinitely without using electricity to refresh the image, while allowing the image to be changed later. E-paper can also be implemented as a flexible, thin sheet, like paper. By contrast, a typical flat panel display does not exhibit the same flexibility, uses a backlight to illuminate pixels, and has to be periodically refreshed in order to maintain the display of an image. Typical e-paper implementations include an e-paper display and electronics for rendering and displaying digital media on the e-paper, such as electronic books ("e-books"). However, the majority of the cost associated with these platforms lies in the electronics used to write on the e-paper, while the cost of the e-paper is considerably less.

Manufacturers and users of display platforms continue to seek cost effective systems and methods for writing on e-paper and a variety of display platforms using e-paper.

BRIEF DESCRIPTION OF THE DRAWINGS

FIGS. 8A-8C show different views of a second example printing system configured in accordance with one or more embodiments of the present invention.

DETAILED DESCRIPTION

Embodiments of the present invention are directed to systems and methods for writing on electronic paper ("e-paper") and display platforms implemented with e-paper. The display platforms included, but are not limited to, cards, posters, general signage, pricing labels, and any other platforms upon which e-paper can be displayed and system and method embodiments of the present invention can be used to write on the e-paper. A general description of the configuration and operation of e-paper is provided in a first subsection. A description of system and method embodiments for writing on e-paper and a description of display platforms implemented with e-paper are provided in a second subsection.

Electronic Paper

Figure 1A:
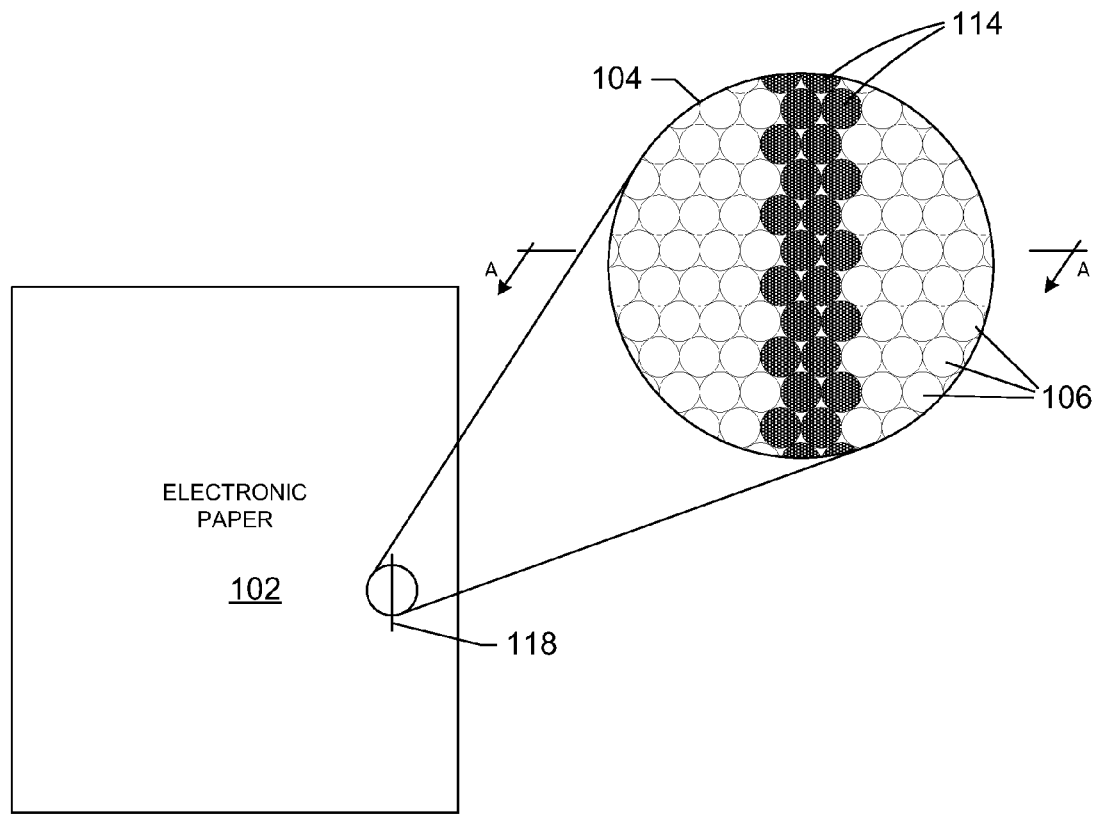
FIG. 1A shows a plan view of an example piece of electronic paper.
Figure 1B:
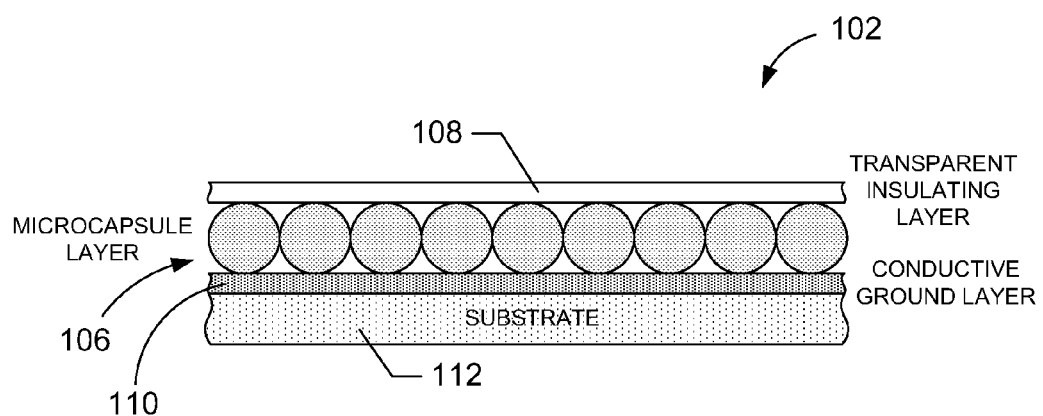
FIG. 1B shows a cross-sectional view of a portion of the electronic paper, shown in FIG. 1A, along a line A-A.

FIG. 1A shows a plan view of an example piece of e-paper 102 and includes an enlargement 104 of a small portion of the e-paper 102. The enlargement 104 reveals the e-paper 102 includes an array of embedded, spherical-shaped microcapsules 106. FIG. 1B shows a cross-sectional view of a portion of the e-paper 102 along a line A-A, shown in FIG. 1A. The cross-sectional view reveals an example multilayer structure of the e-paper 102, including a layer of the microcapsules 106 sandwiched between a transparent insulating layer 108 and a conductive ground layer 110. As shown in FIG. 1B, the conductive ground layer 110 is disposed on a substrate 112. Depending on how the e-paper is used determines the thickness and composition of the various layers. For example, the insulating layer 108 can be composed of a transparent dielectric polymer and can range in thickness from approximately 100 nm to approximately 14 μm. In one embodiment, the thickness of the insulating layer 108 may be about 100 μm. The insulating layer 108 can also be composed of a material that holds charges or is porous or semi-porous to charges and/or ions. The insulating layer 108 can also be composed of a first insulating layer and second patterned conductive layer. The microcapsules, described in greater detail below, can have a diameter of approximately 50 μm, but may also range in diameter from approximately 20 μm to approximately 100 μm. The conductive ground layer 110 can be composed of a transparent conductive material, such as indium tin oxide, or an opaque conductive material and can have a thickness ranging from approximately 5 nm to approximately 1 mm. Typically, the layers 106, 108, and 110 have a total thickness of approximately 100 μm. The substrate 112 can be composed of an opaque material or a transparent material and can range in thickness from approximately 20 μm to approximately 1 mm, or the thickness can be much larger depending on the how the e-paper is used. For example, the substrate 112 can be composed of polyester, plastic, or transparent Mylar. Also, the substrate 112 can be omitted and the layers 106, 108, and 110 can be mounted on a wall or a product chassis.

Ideally the insulating layer 108 serves as a wear protection layer for the layer of microcapsules 106 and normalizes the e-paper surface, eliminating surface topography and blocking surface conduction paths on the microcapsule surfaces. A variation on e-paper 102 includes the layer of microcapsules 106, the ground layer 110, and the substrate 112, but the insulating layer 108 can be omitted.

The microcapsules 106 can be filled with one or more pigment particles that can be used to display images by looking at the e-paper 102 from the insulating layer 108 side, although typical e-paper is viewed through the substrate layer 112. For example, returning to FIG. 1A, the microcapsules 106 in the microcapsule layer can be configured with white and black particles. Each microcapsule can form a black and white pixel or groups of adjacent microcapsules can form a black and white pixel. When white particles of a microcapsule are located near the insulating layer 108 the microcapsule appears white to a viewer, and when the black particles of a microcapsule are located near the insulating layer 108 the microcapsule appears black to the viewer. For example, enlargement 104 shows a thin vertical line 118 displayed in the e-paper 102 by a number of microcapsules 114 with black particles located near the insulating layer 108 surrounded by microcapsules 106 with white particles located near the insulating layer 108. The microcapsules 106 are designed to exhibit image stability using physico-chemical adhesion between particles and/or between the particles and the microcapsule surface. For example, the black and white microcapsules ideally can hold text and images indefinitely without drawing electricity, while allowing the text or images to be changed later.

Figure 2A:
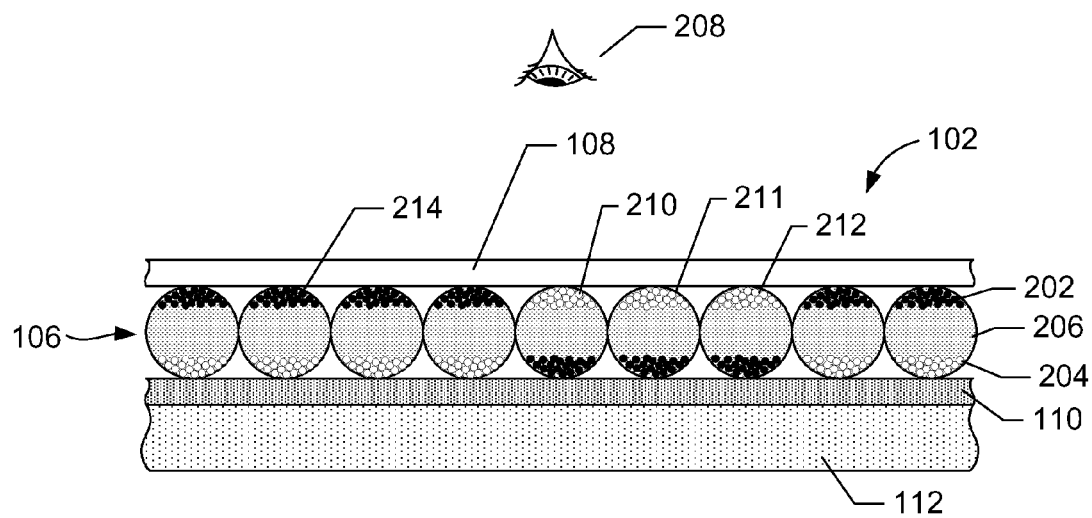
FIGS. 2A-2D show four examples of microcapsule implementations of electronic paper.

FIGS. 2A-2D show four examples of microcapsule implementations of e-paper. In the example of FIG. 2A, each microcapsule includes black particles 202 and while particles 204 suspended in a transparent fluid 206. The particles can be of opposite charges. For example, the black particles 202 can be positively charged particles and the white particles 204 can be negatively charged particles. One or more microcapsules form a pixel of black and white images displayed on the e-paper 102. The black and white images are created by placing white or black particles near the insulating layer 108. For example, the microcapsules 210-212 with white particles located near the transparent insulating layer 108 reflect white light and appear white to a viewer 208. By contrast, the microcapsules with black particles located near the transparent insulating layer 108, such as microcapsule 214, appear black to the viewer 208, corresponding to a black portion of the image displayed on the e-paper 102. Various shades of gray can be created by varying the arrangement of alternating microcapsules with white and black particles located near the insulating layer 108 using halftoning.

Figure 2B:
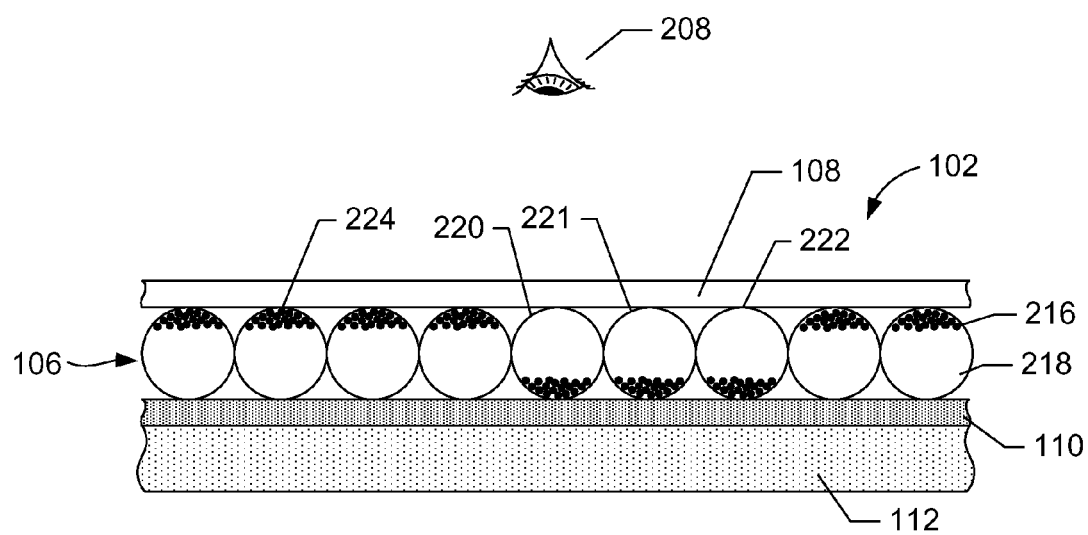

In the example of FIG. 2B, each microcapsule includes black particles 216 suspended in a white colored fluid 218. The black particles 216 can be positively charged particles or negatively charged particles. One or more microcapsules form a pixel of black and white images displayed on the e-paper 102. The black and white images are created by placing black particles near or away from the insulating layer 108. For example, the microcapsules 220-222 with black particles located away from the transparent insulating layer 108 reflect white light, corresponding to a white portion of an image displayed on the e-paper 102. By contrast, the microcapsules with black particles located near the transparent insulating layer 108, such as microcapsule 224, appear black to the viewer 208, corresponding to a black portion of the image displayed on the e-paper 102. Various shades of gray can be created by varying the arrangement of alternating microcapsules with black particles located near or away from the insulating layer 108 using halftoning.

Figure 2C:
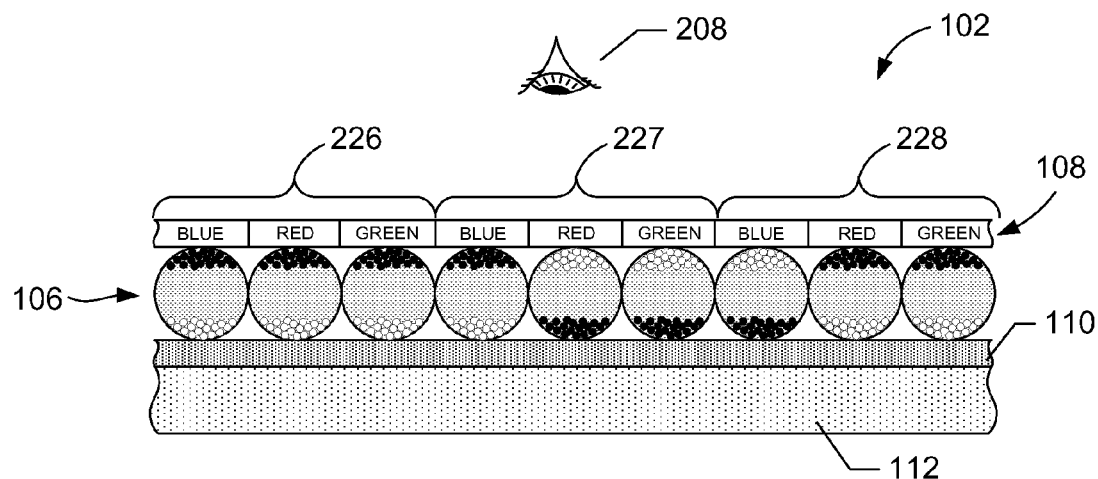

In the example of FIG. 2C, the e-paper 102 is configured as described above with reference to FIG. 2A, except the insulating layer 108 is configured with alternating blue, red, and green regions. Adjacent blue, red, and green regions form color pixels, such as color pixels 226-228. Color images are created by placing different combinations of white or black particles near the insulating layer 108. For example, the microcapsules of color pixel 227 with white particles located near the red and green regions of the transparent insulating layer 108 reflect red and green light from the e-paper which appear in combination as a yellow pixel of a color image observed by the viewer 208. The microcapsules of color pixel 226 have black particles located near the transparent insulating layer 108 causing the color pixel 226 to appear black to the viewer 208. Only one microcapsule of color pixel 228 has white particles located near the blue region of the transparent insulating layer 108 reflecting blue light from the e-paper. The insulating layer 108 may also use other colors to create color images such as regions with yellow, magenta, and cyan. The insulating layer 108 may also include spot colors, such as colors associated with a logo.

Figure 2D:
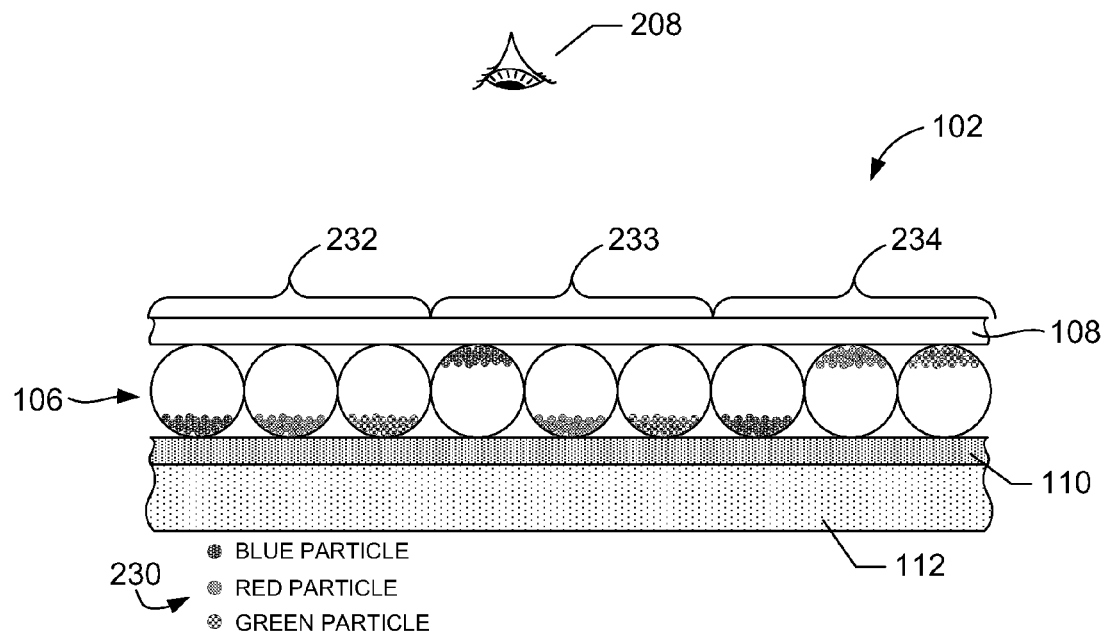

In the example of FIG. 2D, the e-paper 102 is configured as described above with reference to FIG. 2B, except the black particles of each microcapsule are replaced by either blue, red, or green positively, or negatively, charged particles, represented by differently shaded particles in legend 230. Microcapsules with adjacent blue, red, and green particles form color pixels, such as color pixels 232-234. Color images are created by placing different combinations of colored particles near the insulating layer 108. For example, the microcapsules of color pixel 234 with red and green particles located near the insulating layer 108 reflect red and green light from the e-paper which appear in combination as a yellow pixel of a color image observed by the viewer 208. The microcapsules of color pixel 232 have colored particles located away from the insulating layer 108 causing the color pixel 232 to appear white to the viewer 208. Only one microcapsule of color pixel 233 has red particles located near the insulating layer 108 reflecting red light from the e-paper.

The e-paper 102 and variations shown in FIGS. 2A-2D represent only a handful of many different varieties of e-paper that is suitable for use with the electronic paper writing systems and methods of the present invention. Other types of e-paper include electrophoretic paper, field induced displays, or any other display surface activated by an electrical field directed substantially perpendicular to the display surface.

Electronic Paper Writing Systems and Methods

For the sake of simplicity and brevity, writing systems and method embodiments are described using the e-paper described above with reference to FIG. 2A. However, writing systems and methods are not intended to be limited in their application. The writing systems and methods can be used to write to any type of e-paper, including any of the kinds of e-paper described above in the preceding subsection.

Figure 3:
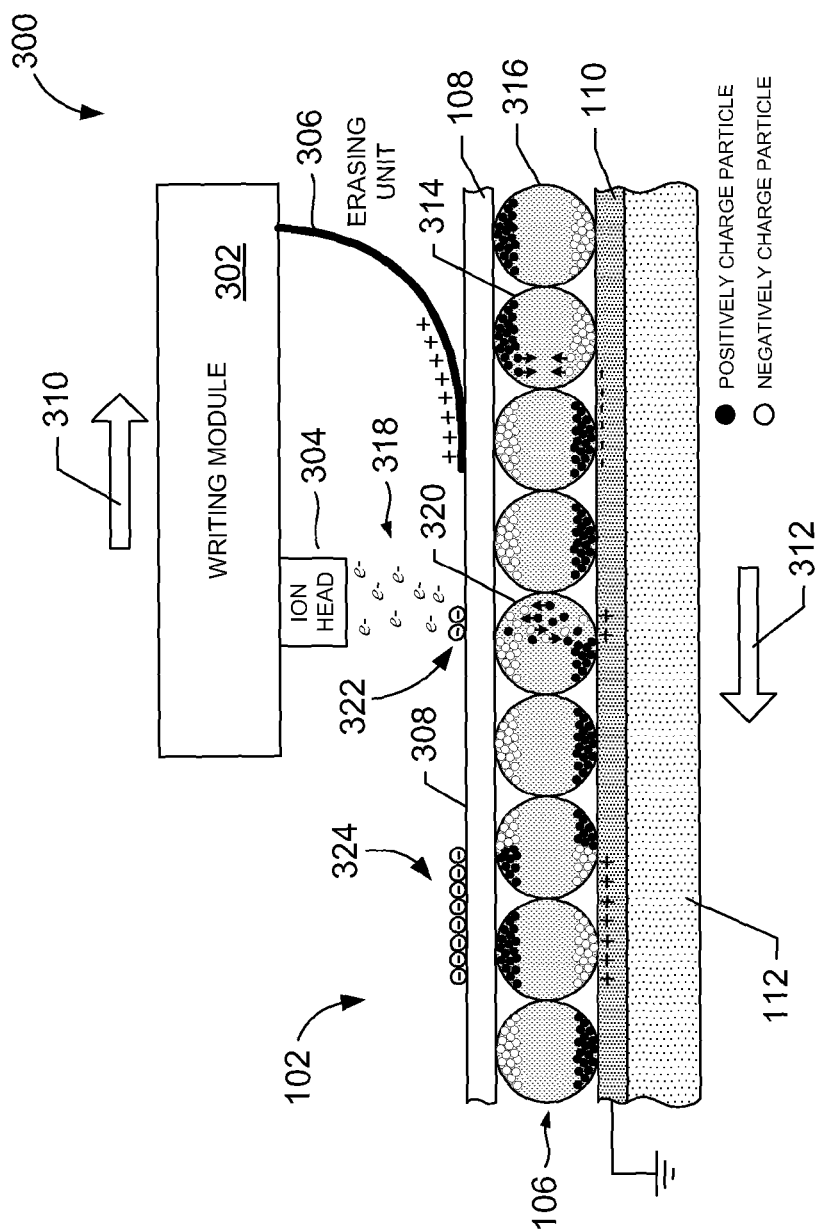
FIG. 3 shows a side view and schematic representation of a first example writing system configured in accordance with one or more embodiments of the present invention.

FIG. 3 shows a side view and schematic representation of an example writing system 300. The writing system 300 includes a writing module 302, writing unit 304, and an erasing unit 306. The writing unit 304 and erasing unit 306 are connected to the same side of the writing module 300 that faces the outer surface 308 of the insulating layer 108, with the ion head 304 suspended above the surface 308. In the example of FIG. 3, the writing unit 304 is an ion head and the erasing unit 306 can be an electrode that comes into close contact with, or can be dragged along, the surface 308 in front of the ion head 304. The writing module 302 can be moved in the direction 310 and the e-paper held stationary; or the e-paper 102 can be moved in the direction 312 and the writing module 302 held stationary; or the writing module 302 is moved in the direction 310 and the e-paper 102 is simultaneously moved in the opposite direction 312.

In the example shown in FIG. 3, the black particles and the white particles of the microcapsules are positively charged and negatively charged, respectively. The erasing unit 306 erases any information stored in the microcapsules prior to writing information with the ion head 304. In the example shown in FIG. 3, as the e-paper 102 passes under the writing module 302, the positively charged erasing unit 306 can remove negatively charge ions attached to the surface 308. The positively charge erasing unit 306 also creates electrostatic forces that drive positively charged black particles away from the insulating layer 108 and attract negatively charged white particles toward the insulating layer 108. For example, as shown in FIG. 3, as the positively charged erasing unit 306 passes over the surface 308 and approaches microcapsule 314, positively charged black particles of the microcapsule 314 are repelled by the positive charge and driven away from the insulating layer 108. By contrast, negatively charged white particles are attracted to the erasing unit 306 and driven toward the insulating layer 108. When the erasing unit 306 reaches the microcapsule 316, the white and black particles of the microcapsule 314 are reversed and the microcapsule 314 reflects white light.

FIG. 3 also reveals the writing operation performed by the ion head 304. In certain embodiments, the ion head 304 can be implemented as described in U.S. Pat. No. 7,623,144, issued Nov. 24, 2009 to Hewlett-Packard Development Company, L.P. The ion head 304 is configured and operated to selectively eject electrons, e−, 318 toward the insulating layer 108, when a region of the e-paper located beneath the ion head 304 is to be changed from white to black. As the electrons reach the surface 308, the negatively charged white particles are repelled and driven away from the insulating layer 108, while the positively charged black particles are attracted to the negatively charged electrons and driven toward the insulating layer 108. For example, as shown in FIG. 3, as the ion head 304 passes over a microcapsule 320 while ejecting electrons, the negatively charged white particles are repelled away from the insulating layer 108 and the positively charged black particles are driven toward the insulating layer 108. The electrons 318 can attach to the insulating layer 108 over the regions that are to be written to, or the electrons 318 can create ions that are absorbed by adhesion forces to the surface 308. In the case where ions are formed, it is believed that as the electrons 318 are ejected from the ion head 304, the electrons interact with certain air molecules to form negatively charge molecular ions 322 that attach to the surface 308. For example, it is believed that carbon dioxide in the air gap between the ion head 304 and the surface 308 interacts with the ejected electrons to form a negatively charged carbon dioxide ion that attaches to the surface 308.

Embodiments of the present invention are not limited to the ion head 304 discharging electrons and the erasing unit 306 erasing information with positive charges. The microcapsules 106 of the microcapsule layer can be composed of negatively charged black particles and positively charged white particles. In other embodiments, the ion head 304 can be configured to produce positively charged ions, which attach to the surface 308, and the erasing unit 306 can use negative charges to erase information stored in the microcapsule layer of the e-paper 102. In other embodiments, the writing unit can be any charge injection device with sufficient addressability and resolution. For example, the writing unit can be a plasma generating needle.

The negatively charged molecular ions attached to the surface 308 may help to preserve information written to the e-paper 102. For example, FIG. 3 shows negatively charged molecular ions 324 attached to the surface 308. The negatively charged ions 324 maintain the positively charged black particles located near the insulating layer 108 and the negatively charged white particles located away from the insulating layer 108, preserving the information written to the e-paper 102.

When the e-paper 102 is handled by a person after writing, moisture, oils from the person's hands, and static electricity or tribo-charges carried by the person may alter the charge distribution over the surface 308 or inside the layer 108. These charges may be large enough to cause a redistribution of white and black particles in microcapsules. For example, the negatively charged ions may be moved along the surface 308 switching portions or entire microcapsules from white to black. In order to prevent image distortion due to tribo-charges, or other charge changing factors, which might occur due to handling, the particles, the fluid filling the microcapsules 106, and the insulating layer 108 can be designed to assure that magnitude of applied charges or rate of change of charge magnitude needed to move pigmented particles exceed the magnitudes of the charges and rates of their change associated with handling. For example, the e-paper 102 could be designed so that charges and charged particles attached to the surface 308 or inside the layer 108 are redistributed with charges and electrical fields that can only be generated during the writing phases.

Figure 4A:
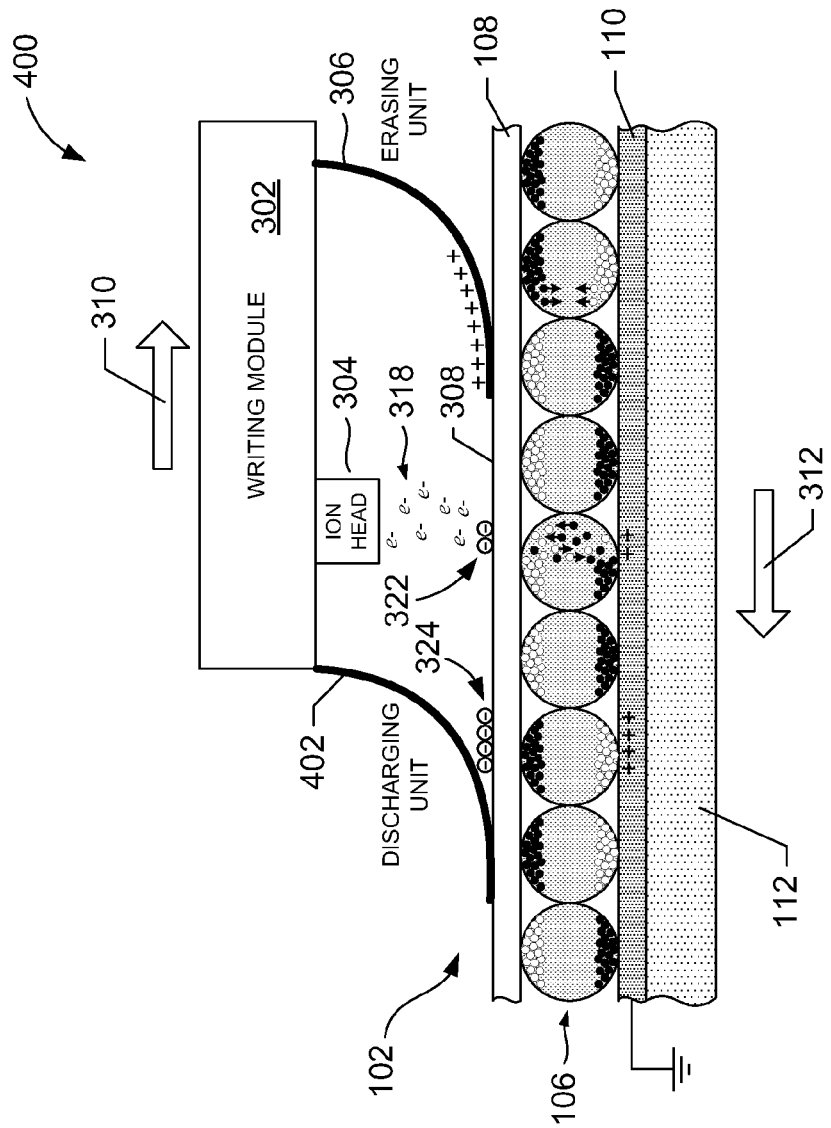
FIGS. 4A-4B show a side view and a schematic representation of a second example writing system configured in accordance with one or more embodiments of the present invention.

In other embodiments, writing systems can also be configured with a discharging unit that removes ions from the surface 308 after the ion head 304 has been used to write information into the layer of microcapsules 106. The discharging unit can be an active or a passive contact device that removes positive or negative charges from the surface 308. For example, the discharging unit 402 can be composed of carbon conductive plastic or a conductive rubber and operated so that charges jump from the surface 308 onto the discharge unit. FIG. 4A shows a side view and schematic representation of an example writing system 400. The writing system 400 is similar to the writing system 300 described above except the writing system 400 includes a discharging unit 402 connected to the same side of the writing module 300 that faces the outer surface 308 of the insulating layer 108. As shown in the example of FIG. 4, the discharging unit 402 can be a passive or active device that is dragged behind the ion head 304 along the surface 308. The discharging unit 402 removes negatively or positively charged ions or charges from the surface 308 thereby reducing the likelihood that during handling of the e-paper 102 ions are redistributed on the surface 308 causing a redistribution of white and black particles in microcapsules. For example, FIG. 4A shows a snapshot of the negatively charged molecular ions 324 attached to the surface 308 after information is written to the microcapsules 404 and 406 being removed from the surface 308 by the discharging unit 402. In certain embodiments, a passive discharging unit 402 can be a rubber material that touches the surface 308 as the e-paper 102 passes under the writing system 400.

Figure 4B:
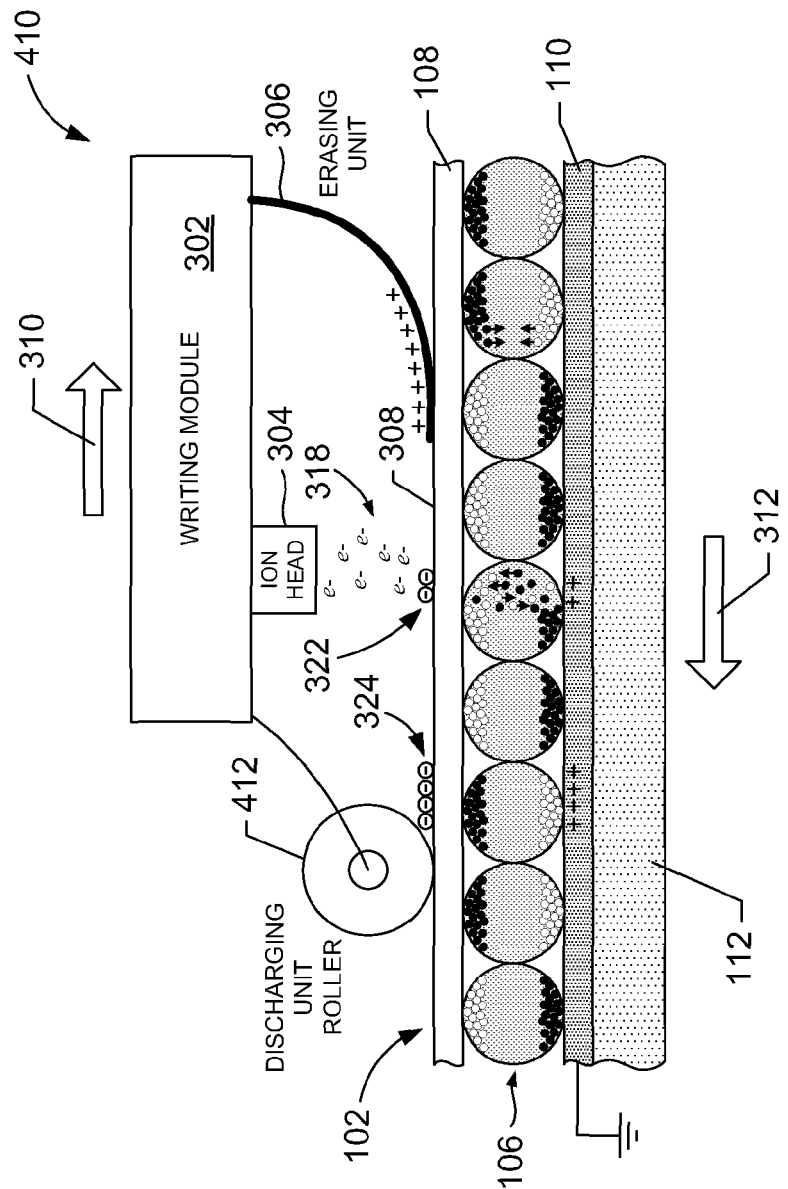

In other embodiments, an active discharging unit 402 can be a charged roller composed of a conductive rubber that removes charges from the surface 308 as the roller passes over the surface 308. FIG. 4B shows a side view and schematic representation of an example writing system 410. The writing system 410 is similar to the writing system 400 except the discharging unit 402 is a charged roller 412 that removes charges from the surface 308.

Figure 5:
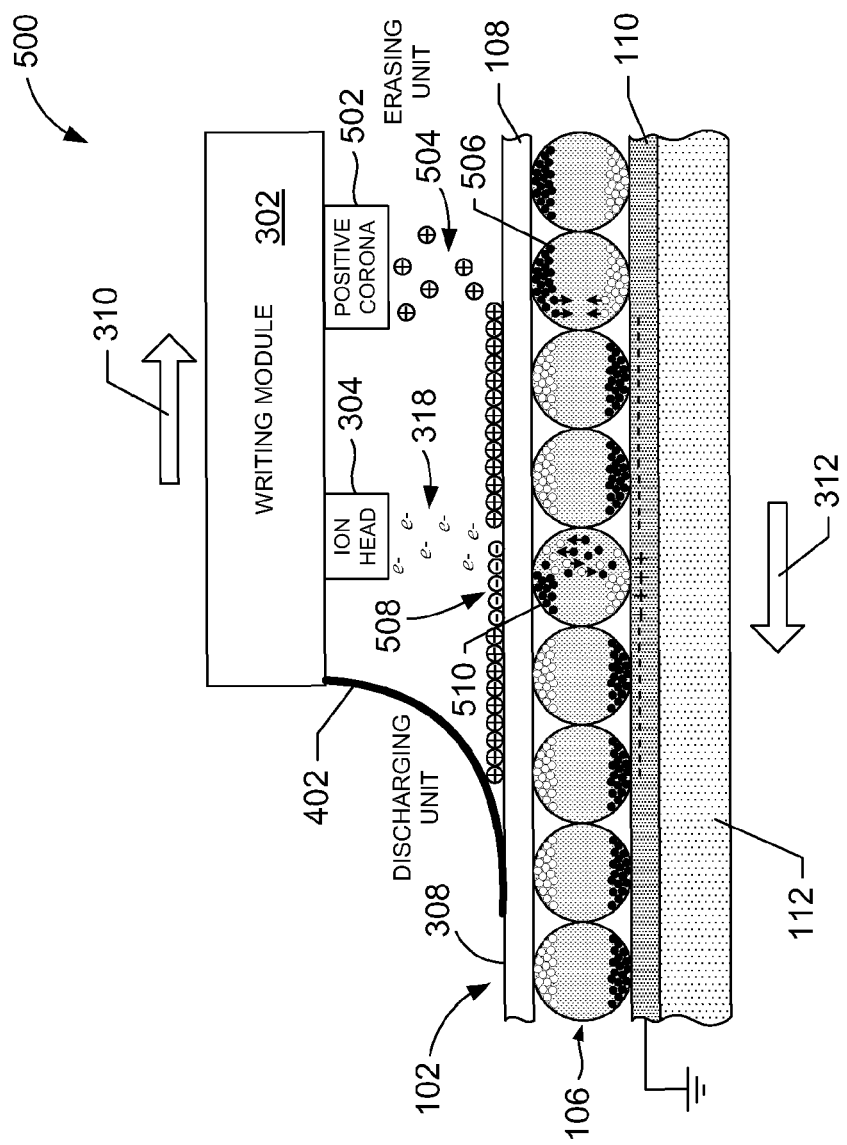
FIG. 5 shows a side view and schematic representation of a third example writing system configured in accordance with one or more embodiments of the present invention.

In other embodiments, the erasing unit 306 of the writing systems 300 and 400 can be replaced by an AC or DC operated corona. FIG. 5 shows a side view and schematic representation of an example writing system 500. The writing system 500 is similar to the writing system 400 except the erasing unit 306 is replaced with a corona 502. In the example of FIG. 5, the corona 502 is configured to generate a plasma of positively charged ionic species that migrate onto the surface 308 by converting naturally occurring gaseous molecules and atoms located in the air gap between the corona 502 and the surface 308 into positively charged ions that are deposited onto the surface 308. For example, in certain embodiments, the corona 502 can be configured to convert naturally occurring nitrogen ("$N_2$") located in the air gap between the corona 502 and the surface 308 into positively charged nitrogen gas ions ("$N_2$") that are deposited onto the surface 308. In other embodiments, the writing module can be configured to inject molecules or atoms, such as $N_2$ or argon ("Ar"), into the corona 502, which in turn converts the charge neutral molecules or atoms into positively charged ions that are deposited onto the surface 308.

FIG. 5 also shows a snapshot of the e-paper 102 passing under the corona 502 as positively charged ions 504 generated by the corona 502 migrate and are deposited onto the surface 308. As represented in microcapsule 506, the positively charged ions attach to the surface 308 and create repulsive electrostatic forces that drive the positively charged black particles away from the insulating layer 108 and create attractive electrostatic forces that drive negatively charged white particles toward the insulating layer 108, erasing information contained in microcapsule 506. The ion head 304 is operated to selectively write information into microcapsules by ejecting electrons 318 that change the ions deposited on the surface 308 from positively charged ions into negatively charged ions 508. For example, FIG. 5 shows a snapshot of information being written to microcapsule 510. The negatively charged ions 508 attached to the surface 308 create repulsive electrostatic forces that drive the negatively charged white particles away from the insulating layer 108 and create attractive electrostatic forces that drive positively charged black particles toward the insulating layer 108. After information is written to the microcapsules, the e-paper 102 continues to pass under the discharging unit 402, which removes the negatively and positively charged ions from the surface 308.

In other embodiments, the corona 502 described above with reference to FIG. 5 can be used as a discharging unit 402. For example, the discharging unit represented by the roller 412, shown in FIG. 4B, can be replaced by an AC or DC operated corona that generates a plasma of an appropriate charge for removing charges or ions attached to the surface 308.

For the sake of simplicity, the writing unit is described above as having only one ion head, but embodiments of the present invention are not intended to be so limited. In practice, writing system embodiments can be implemented with two or more ion heads. The ion heads can also be used to erase and write information to the e-paper. For example, a first ion head can be operated as an erasing unit and a second ion head can be operated as described above to write information to the e-paper. In still other embodiments, the ion head 304 can be replaced by one or more needles operated to supply a charge of an appropriate magnitude for writing information to the microcapsule layer.

Figure 6A:
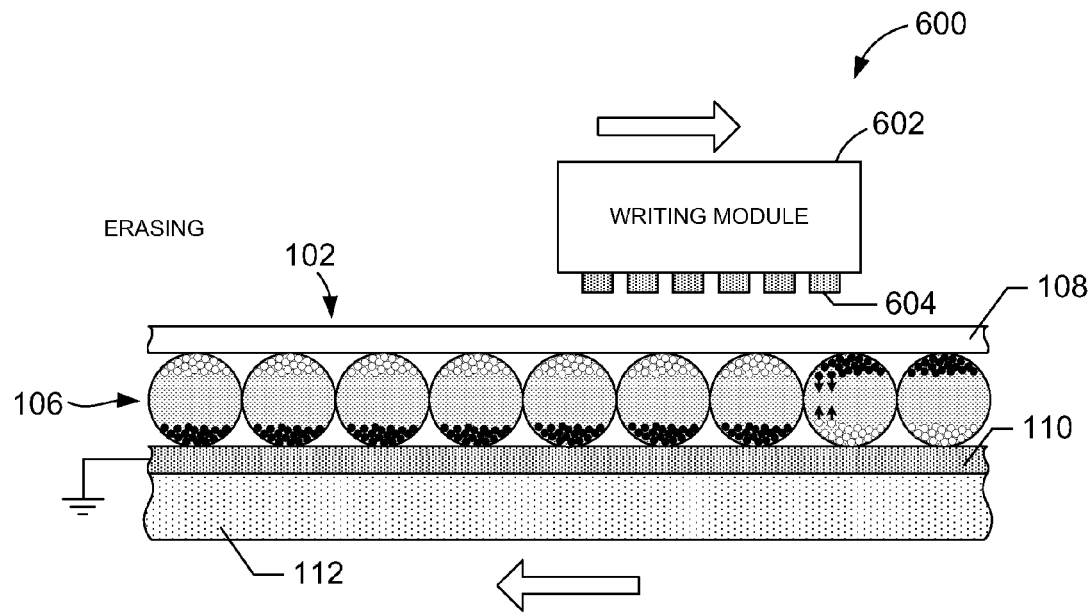
FIGS. 6A-6C show side views of three writing systems configured in accordance with one or more embodiments of the present invention.
Figure 6B:
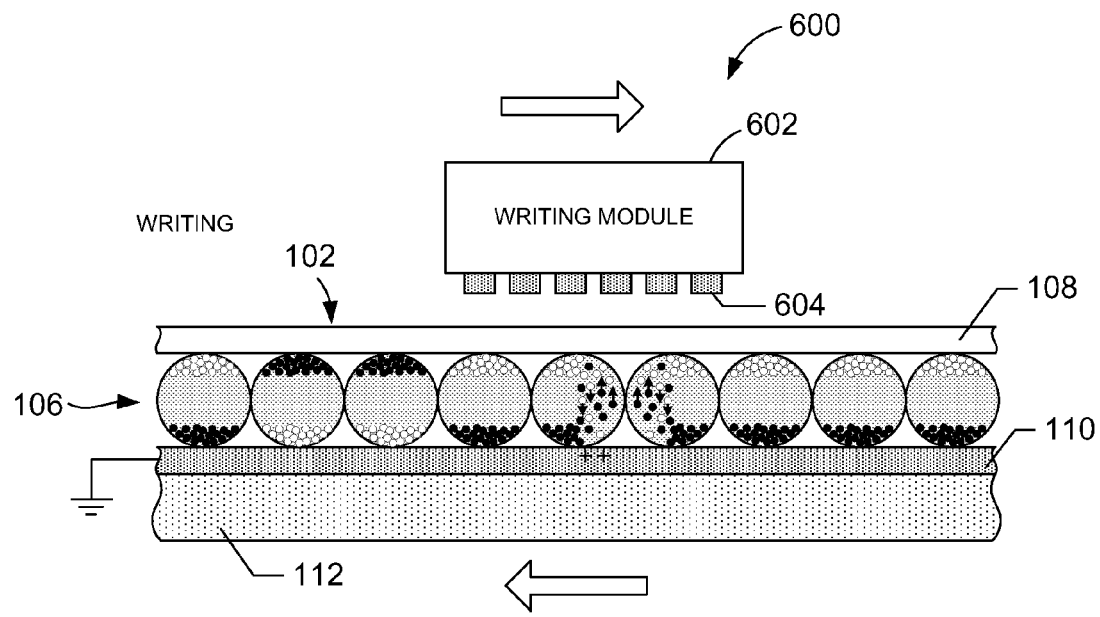

Writing system embodiments also include writing modules with an array of electrodes that face the surface 308 of the e-paper 102 and are used to erase information in a first pass of the e-paper and in a second pass of the e-paper the electrodes can be selectively operated to write information to the e-paper 102. FIGS. 6A-6B show side views of a writing system 600. The writing system 600 includes a writing module 602 and a one-dimensional or two-dimensional array of electrodes 604. Each electrode in the array of electrodes can be individually operated by suitable addressing systems in order to selectively erase and write information to the e-paper. The writing system 600 is oriented so that the electrodes face the surface 308 of the e-paper 102. The writing system 600 can be operated by first erasing the information stored in the e-paper followed by a second pass that selectively writes information to the e-paper 102. In FIG. 6A, the writing system is operated to erase information stored in the microcapsule layer by supplying a positive charge that drives positively charge black particles away from the insulating layer 108 and drives negatively charged white particles toward the insulating paper 108. In FIG. 6B, the writing system is operated to selectively write information into the layer of microcapsule 106 by supplying a negative charge that attracts positively charge black particles toward the insulating layer 108 and drives negatively charged white particles away from the insulating paper 108. In other embodiments, the writing module 602 can include an erasing unit 306 and the array of electrodes 604 can be operated to write information to the e-paper.

Based on the information that is to be written to the e-paper 102, an electrical voltage signal is provided to the writing module 602 having an array of electrodes 604. The writing module 602 selectively operates one or more electrodes in the array of electrodes 604 using an addressing system and applies the electrical voltage signal to the electrodes. The addressing system may be understood as a system to select electrodes based on their position, such as rows and columns in the array of electrodes 604 and apply a voltage of a predetermined magnitude to the selected electrode. The addressing system is so designed that the electrodes in the array of electrodes may be individually addressable. The electrodes transfer electrical charge to the e-paper 102 based on the electrical voltage signal to write information to the e-paper 102. In one example, the electrodes can be operated in order to selectively erase and write information to the e-paper, as will be discussed below.

Figure 6C:
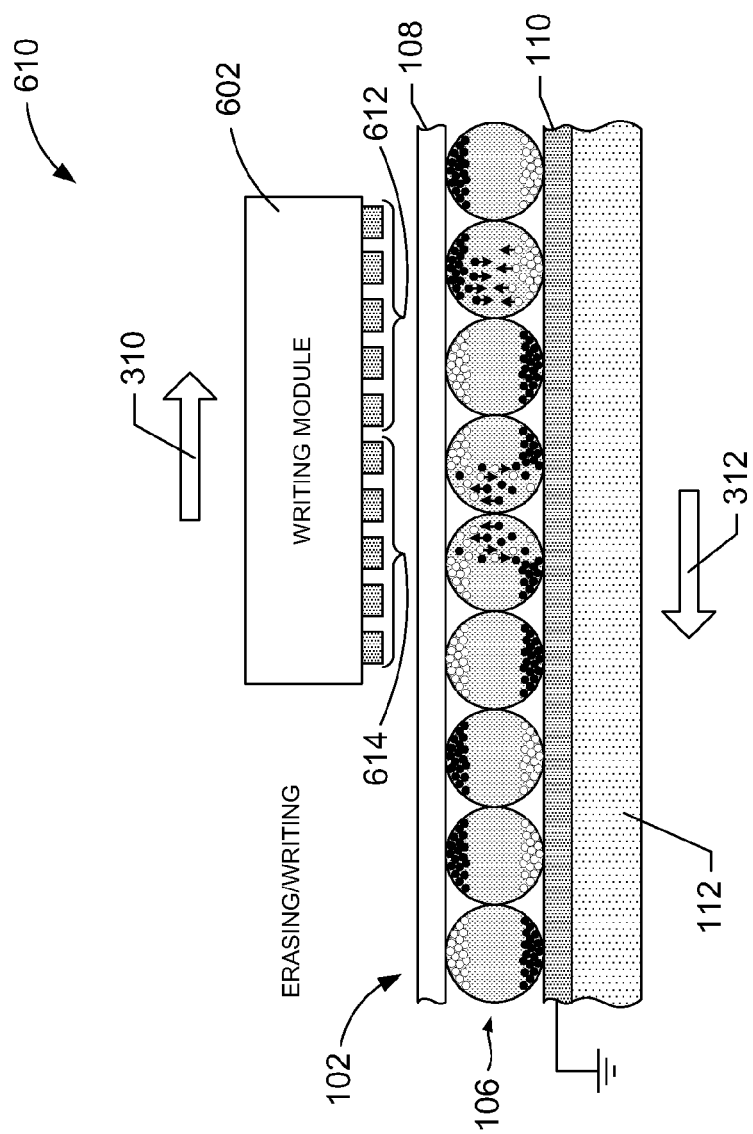

Writing systems also include writing modules with an array of electrodes that can erase and write in a single pass. A portion of the electrodes can be dedicated to erasing while another portion of the electrodes can be dedicated to writing information to the e-paper. FIG. 6C shows a side view of a writing system 610. The writing system 610 includes the writing module 602 and a one-dimensional or two-dimensional array of individually addressable electrodes 604. As shown in FIG. 6C, a first portion of the electrodes 612 is operated to erase information stored in the layer of microcapsules 106, and a second portion of electrodes 614 is operated to write information to the layer of microcapsules 106. Note that direction of motion can be sensed, and the operation of the electrodes 604 can be dynamically changed to reduce motion direction sensitivity.

In other embodiments, the two-dimensional array of individually addressable electrodes can be dimensioned to substantially match the dimensions of the e-paper, enabling the array of electrodes to erase and write to the entire e-paper without scanning. For example, the two-dimensional array of electrodes engages or contacts the e-paper perpendicular to the e-paper surface using a solenoid motor or other mechanical system.

In some examples, where methods and systems to write on an e-paper involve contact of a writing module with the e-paper, a compliant mechanism may be provided to establish the contact of the writing module 602 with the e-paper 102. The compliant mechanism may be provided either on the writing module 602 or the e-paper 610. In one example, the compliant mechanism may be a thin layer of a compliant material that acts as an intermediately between the e-paper 102 and the writing module 602. The compliant material possesses flexibility and flexes under the pressure of the writing module 602 as the writing module 602 establishes contact with the e-paper 102, thus allowing an increased contact between the e-paper 102 and the writing module 602.

Figure 6D:
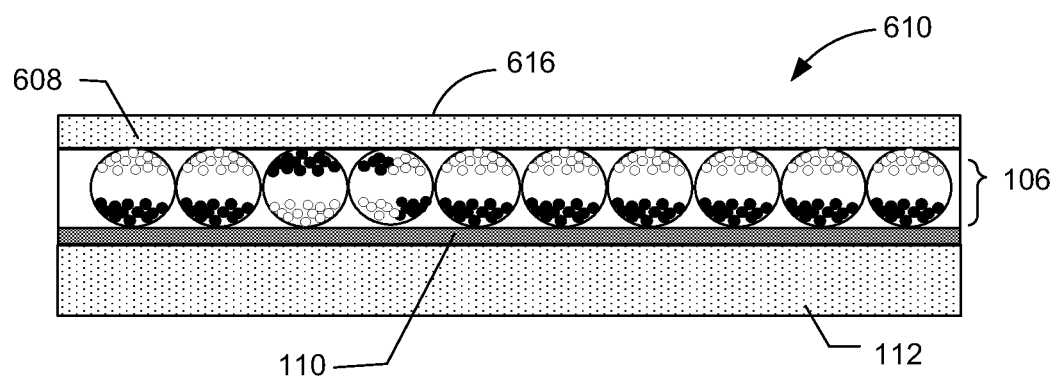
FIG. 6D shows an example of a cross-sectional view of a portion of an electronic paper having a compliant layer.

The e-paper 102 generally has a flexible, thin sheet, paper like structure. At a microscopic level the surface of the e-paper 610 may not be completely flat. Surface irregularities ranging up to +/−10 microns may exist. These irregularities may make it difficult for the writing module 602 comprising the array of electrodes 604, which typically is rigid, to contact properly with the surface of the e-paper 102. As a result, the image quality may deteriorate. Further, improper contact may lead to image distortion due to factors, such as color spatial non-uniformity. The compliant mechanism provides for an improved contact to be established between the e-paper 102 and the writing module 602 in the writing phase. The compliant mechanism may provide enhanced quality of the information displayed on an e-paper in contact based writing. In one example, the uppermost layer of the e-paper 102, that is, the insulating layer 108 may be replaced by a compliant layer 608 as shown in FIG. 6D. FIG. 6D illustrates a cross-sectional view of a portion of an e-paper 610 with the compliant layer 608. In one example, the insulating layer 108 may be made of a compliant material. In the writing phase, the writing module 602 establishes contact with the e-paper 610 through the compliant layer 608.

As shown in FIG. 6D, the layer of the microcapsules 106 comprising charged pigments is interposed between the compliant layer 608 and the conductive ground layer 110. The conductive ground layer 110 and the compliant layer 608 are electrically coupled such that the conductive ground layer 110 is at a ground potential and the compliant layer 608 may be at a higher potential with respect to the ground potential. For example, in a writing phase, an electrical field applied to the compliant layer 608 with respect to the conductive ground layer 110 may cause redistribution of charged pigments in the layer of the microcapsules 106.

The compliant layer 608 that provides for enhanced contact in contact based writing may, in one example, may be made of a conductive material. The conductivity of the compliant layer 608 made of the conductive material, in one example, may be in a range of about $10^7$ to $10^9$ ohm cm. In other examples, the compliant layer 608 may be made of a dielectric material having a dielectric constant in the range of about 3 to 10.

In one example, the compliant layer 608 is made of a compliant material, such as rubber or polymer, such as urethane. Other examples of the compliant material include conductive silicon, conductive sponge, for instance, conductive sponge with open cell or with close cell. The electrical conductivity of the material may be adjusted for optimum performance. In one example, the conductivity of the material may be adjusted by mixing carbon black to the material. In one example, salts conductive agents, for example, lithium may also be used to adjust the conductivity. In some examples, a combination of carbon black and salts conductive agents may be used.

The thickness of the compliant layer 608 may be based on, for example, the material of the compliant layer 608. In one example, the thickness of the compliant layer 608 may be in the range of about 10-100 microns. Further, in an example, the compliant layer 608 may have a Durometer in a range of about 10-40 Shore A.

As discussed previously, the layer of the microcapsules 106 contain charged pigments that rearrange to display information on the e-paper 610. In some examples, the compliant layer 608 may be transparent to allow viewing from the writing side, i.e., the side of the e-paper 610 that makes a contact with the writing module 602 in the writing phase. In the e-paper 610, the conductive ground layer 110 is disposed on the substrate 112. In some examples, the e-paper 610 may not include the substrate 112.

The microcapsules 106 of the microcapsule layer can also be composed of negatively charged black particles and positively charged white particles. In other embodiments, the writing system is operated to erase information stored in the microcapsule layer by supplying a negative charge that drives negatively charged black particles away from the insulating layer 108 and attracts positively charged white particles toward the insulating paper 108, and the writing system is operated to selectively write information into the microcapsule layer by supplying a positive charge that attracts negatively charged black particles toward the insulating layer 108 and drives positively charged white particles away from the insulating paper 108. As mentioned previously, writing systems including writing modules comprising an array of electrodes 604 that may include a one-dimensional or two-dimensional array of individually addressable electrodes 604. In one example, the writing module 602 may be configured to write information to the electronic paper 102 by selectively operating the array of electrodes 604. The writing module 602 applies voltage signal to one or more electrodes of the array of electrodes 604, in accordance with the information that is to be written on the e-paper 610. The electrodes supply a charge of a magnitude corresponding to the applied voltage to the compliant layer 608, for writing information to the e-paper 610.

In one implementation, in the writing phase, the writing module 602 may be in a writing proximity to the e-paper 610. In one example, the writing proximity may be understood as a distance between the array of electrodes 604 and the compliant layer 608, such that charged pigments in the layer of microcapsule 106 may be rearranged to display information based on the voltage signal applied to the array of electrodes 604. In an example, the writing proximity may be the distance of a few microns between the array of electrodes 604 and the compliant layer 608. In another example, in the writing phase, there may be a contact between the writing module 602 and the e-paper 610 such that the array of electrodes 604 touches a top surface 616 of the compliant layer 608. A contact between the writing module 602 and the e-paper 610 where the array of electrodes 604 rests on the top surface 616 of the compliant layer 608 is referred to as a full contact or complete contact in the present description.

In the case of the e-paper 610 with the compliant layer 608, in some examples, to write information on the e-paper 610, the writing module 602 may be suspended at a writing proximity to the e-paper 610 in the writing phase. In such examples, the compliant layer 608 may be made of a dielectric material such that on application of voltage signal from the array of electrodes, information may be written on the e-paper 610. In examples where the writing module 602 may be in complete contact with the e-paper 610, the compliant layer 608 provides for enhanced contact between the writing module 602 and the e-paper 610. Further, in such examples, the compliant layer 608 may be made of a dielectric material as well as of a conductive material.

Figure 6E:
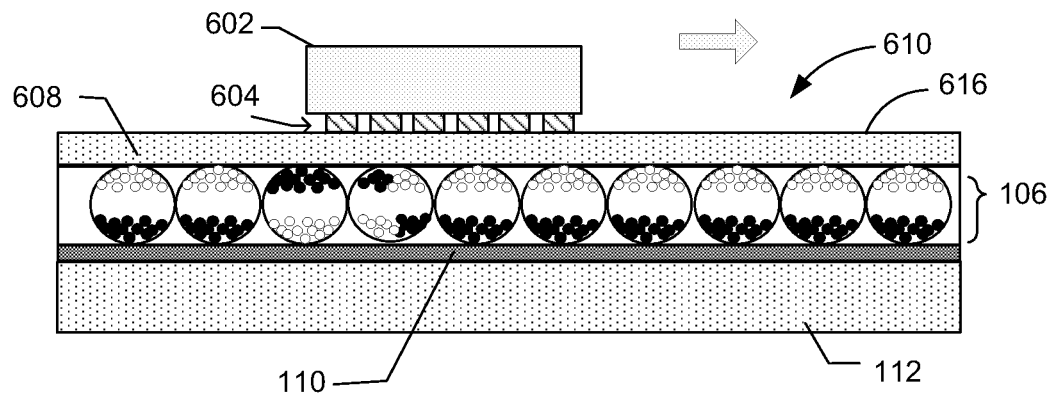
FIG. 6E shows an example of a side view of a writing system.

FIG. 6E depicts the writing module 602 in full contact with the e-paper 610. When the array of electrodes 604 are in full contact with the compliant layer 608 in the writing phase, based on the voltage applied to the electrodes, a distribution of the charged pigments in the layer of microcapsule 106 of the e-paper 610 underneath the compliant layer 608 is changed to display the information on the e-paper 610. Thus, the writing module 602 writes the information to the e-paper 610 through the complaint layer 608. The complaint layer 108, being made of a flexible material, allows firm contact between the array of electrodes 604 and the e-paper 610 and charges are applied to the layer of microcapsule 106 without loss, thus resulting in enhanced quality of the display.

As mentioned previously, in one example, the two-dimensional array of electrodes 604 may be dimensioned to substantially match the dimensions of the e-paper 610. This facilitates the array of electrodes 604 to erase and write to the entire e-paper 610 without scanning.

Figure 6F:
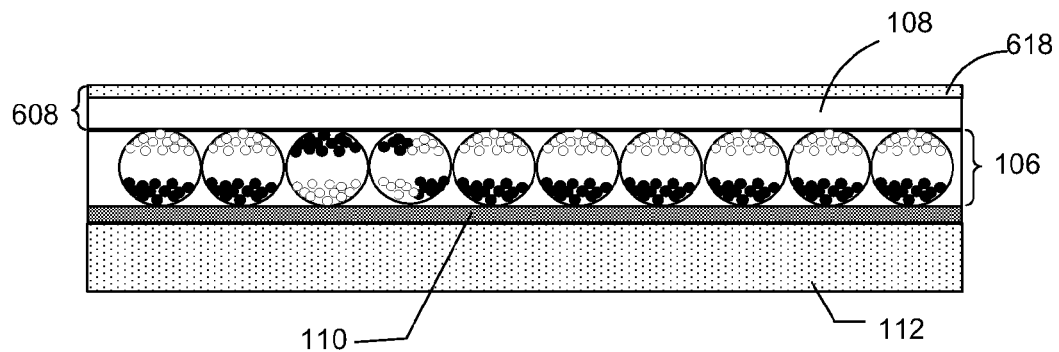
FIGS. 6F-6G show an example of a cross-sectional view of a portion of an electronic paper.

In some examples, a thin layer of the compliant material 618 may be superposed above the insulating layer 108. The insulating layer 108 together with the layer of compliant material superposed above the insulating layer 108 may act as the compliant layer 608. As shown in the example illustrated in FIG. 6F, the thin layer of the compliant material 618 is attached to the insulating layer 108. The insulating layer 108 together with the attached thin layer of the compliant material 618 is depicted as the compliant layer 608. The functioning of the compliant layer 608, the properties, such as conductivity, Durometer, thickness are same as described previously and have not been repeated herein for the sake of brevity of the present description.

Figure 6G:
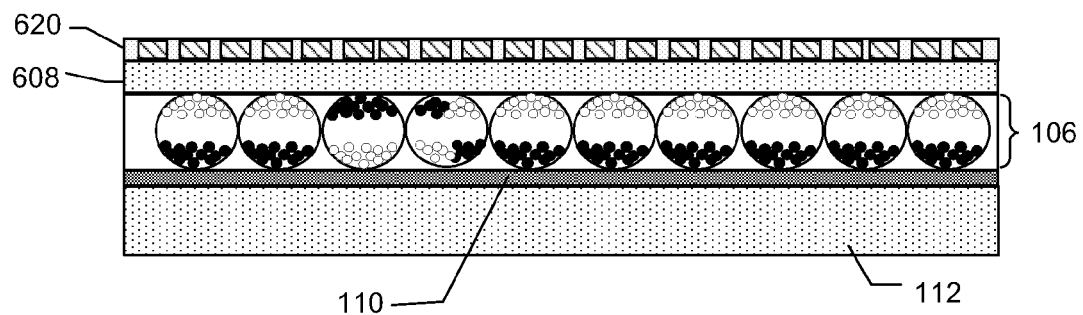

Further, in some example implementations of the e-paper 610, the e-paper 610 may comprise an array of electrodes. For example, as depicted in FIG. 6G, the e-paper 610 includes an integrated array of electrodes 620 superposed on the compliant layer 608. In one example, a two dimensional array of electrodes having a size substantially equal to that of the e-paper 610, may be embedded on the top layer 616 of the e-paper 610. The array of electrodes 604 of the writing module 602 may contact with the integrated array of electrodes 620 in the writing phase to write on the e-paper 610. In the examples where the e-paper 610 comprises the integrated array of electrodes 620, information written on the e-paper 610 may be viewed from the side of the e-paper 610 opposite to the writing side. Accordingly, in one example, the conductive ground layer 110 of e-paper 610 may be made of a transparent material to allow viewing of the information through the conductive ground layer 110 of e-paper 610.

It has been described previously that in some examples the conductive ground layer 110 may be disposed on the substrate 112. In cases where the e-paper 610 comprising the integrated array of electrodes 620 is disposed on the substrate 112, the substrate 112 may also be transparent to allow viewing from the side of the e-paper 610 which is opposite to the writing side.

As mentioned previously, the compliant mechanism may be provided either on the writing module 602 or the e-paper 610. Accordingly, in some examples of systems for writing information on e-papers, to enhanced quality of the information written on e-papers through contact based writing, the systems for writing may comprise compliant mechanisms. The compliant mechanisms may provide for establishing enhanced contact of the writing modules of the systems for writing with the e-papers in the writing phase.

In one example, the compliant mechanism may be provided in the writing module 602 comprising the array of electrodes 604 to enable better contact between the e-paper 102 and the array of electrodes 604 in the writing phase. For example, the compliant mechanism may comprise a spring device coupled to the array of electrodes 604. The spring device may be any spring mechanism provided in the writing module 602 that may enable the writing module 602 to apply pressure on the e-paper 102 to enable better contact in the writing phase. In the writing phase, when the writing module 602 comes in contact with the e-paper 102, the spring device may compress to allow an enhanced contact to be established between the e-paper 102 and the writing module 602.

Figure 6H:
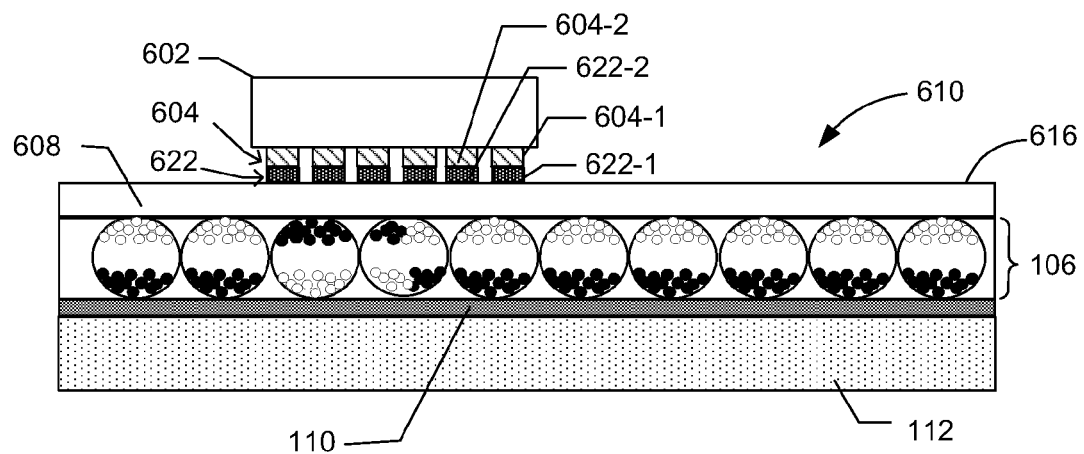
FIGS. 6H-6I show an example of a side view of a writing system.
Figure 6I:
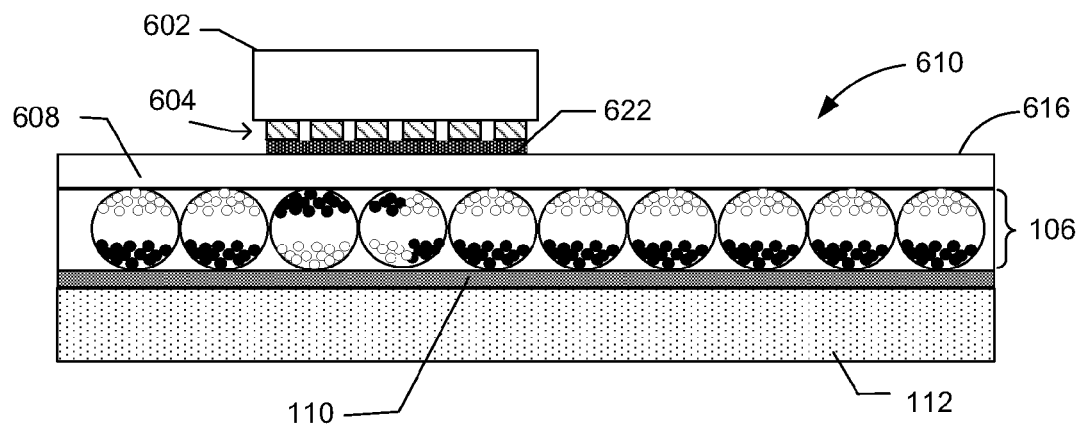

FIGS. 6H-6I show an example of a side view of a writing system comprising compliant mechanisms configured in accordance with one or more examples of the present subject matter. Referring to FIG. 6H, in the illustrated example, a compliant layer 622 is attached to each of the electrodes in the array of electrodes 604. The compliant layers 622 attached to the electrodes are electrically isolated from one another such that there is no cross talk between them. This ensures that the information to be written on a pixel is not subjected to distortion due to the information to be written on neighboring pixels. Accordingly, as illustrated, a first compliant layer 622-1 attached to a first electrode 604-1 in the array of electrodes 604 is electrically isolated from a second compliant layer 622-2 attached to a second electrode 604-2 in the array of electrodes 604. The first electrode 604-1 and the second electrode 604-2, in one example, may be adjacent electrodes in the array of electrodes 604.

Examples of compliant materials that may be used to make the compliant layers 622 include as rubber, polymer and elastomers. Other examples of the compliant material include conductive silicon and conductive sponge. In implementations where the adjacent compliant layers 622 are electrically isolated, the compliant layers 622 may be made of a conductive material having a conductivity of about $1\text{-}10^9$ ohm cm. In one example, the compliant layers 622 may be made of an insulating material having a dielectric constant in a range of approximately 3 to 10. The thickness of the compliant layer 608 may be, for example, in the range of 10-100 microns. Further, in an example, a Durometer of the compliant layer 608 may be in a range of about 10-40 Shore A.

Other examples of systems for writing on e-papers include a continuous compliant layer 624 attached to the writing module 602 comprising the array of electrodes 604 as shown in FIG. 6I. In the illustrated example, a continuous compliant layer 624 of appropriate thickness may be provided at a location of the writing module 602 where the array of electrodes 604 touch the top surface 616 of the e-paper 610. The continuous compliant layer 624 attached to the array of electrodes 604 may undergo compression in the writing phase to enable the writing module 602 and the e-paper 102 to contact completely. For example, the continuous compliant layer 624 may have a Durometer in the range of 10-40 shore A, such that the continuous compliant layer 624 possesses sufficient elasticity to depress under the pressure applied by the writing module 602 in the writing phase.

Examples of compliant materials that may be used to make the continuous compliant layer 624 include, but are not limited to rubber and polymer. In some implementations, the continuous compliant layer 624 may be made of a conductive compliant material. In one example, the conductive compliant material may have a conductivity of about $10^7\text{-}10^9$ ohm cm. In other implementations, the continuous compliant layer 624 may be made of a dielectric compliant material. In one example, the dielectric compliant material may have a dielectric constant of the dielectric compliant material may be about 3 to 10.

In an example, the continuous compliant layer 624 may be a gel layer. A conductive gel, such as a paste that may be refreshed after every few cycles of writings may be used to establish a full contact between the e-paper 102 and the writing module 602. Examples of such gel include family of materials that are generally used in electrocardiography for better contact between electrocardiography electrodes and a human body. In one example, the conductivity of such gel may be adjusted, for example, by adding additives to the gel such that the resultant conductivity is approximately $10^7\text{-}10^9$ ohm cm.

When the writing module 602 comes in contact with the e-paper 102, the continuous compliant layer 624 attached to the array of electrodes 604, being a non-rigid surface, allows a complete contact to be established between the e-paper 102 and the writing module 602.

Figure 7A:
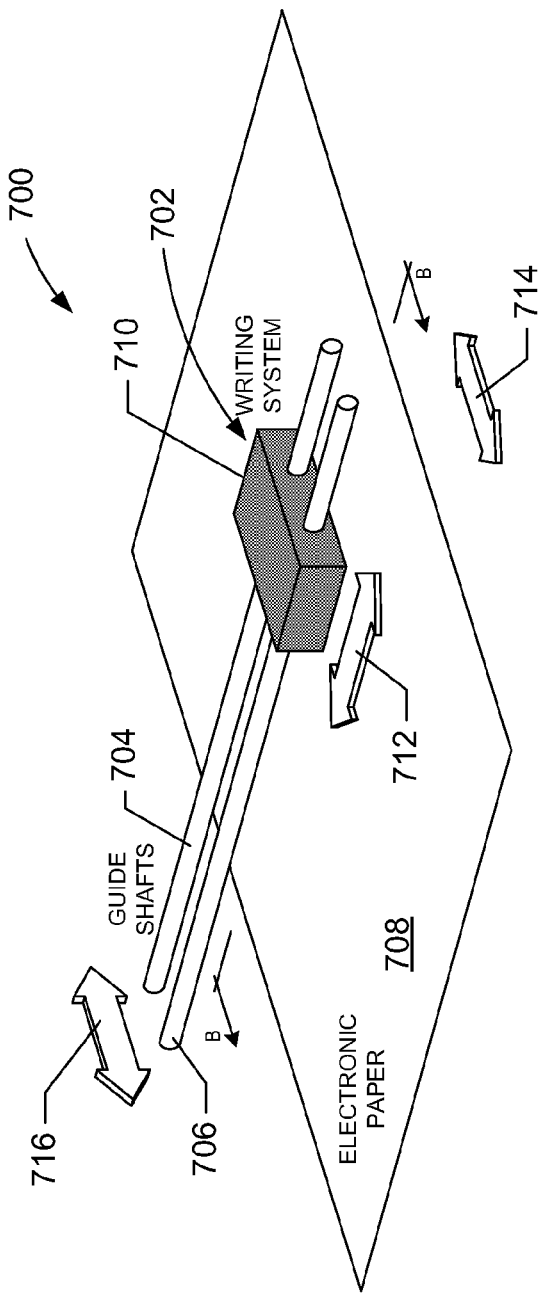
FIGS. 7A-7C show different views of a first example printing system configured in accordance with one or more embodiments of the present invention.

The writing systems described above can be implemented in various kinds of printing systems. FIG. 7A shows an isometric view of an example printing system 700. The printing system 700 includes a writing system 702 mounted on two guide shafts 704 and 706 extending parallel to each other. The writing system 702 is oriented with the erasing unit, ion heads, and discharging unit pointed toward e-paper 708. In the example shown in FIG. 7A, the shafts 704 and 706 extend through the writing module portion of the writing system 702. The writing system 702 can be moved along the shafts 704 and 706 using a circular belt (not shown) attached to the writing module 710 and is driven by a motor (not shown). The writing system 702 is used to write information to the e-paper by raster scanning the writing system 702 back and forth as the writing system 702 is moved along the length of the e-paper 708. The writing system 702 moves back and forth along the shafts 704 and 706 as indicated by directional arrow 712. In certain embodiments, the printing system can be implemented by mounting the shafts 704 and 706 in a housing that holds the shafts 704 and 706 stationary while the e-paper 708 passes under the writing system 702 using a printer carriage (not shown) as indicated by directional arrow 714. In other embodiments, the e-paper can be held stationary while the shafts 704 and 706 are moved along the length the e-paper, as indicated by directional arrow 716.

Figure 7C:
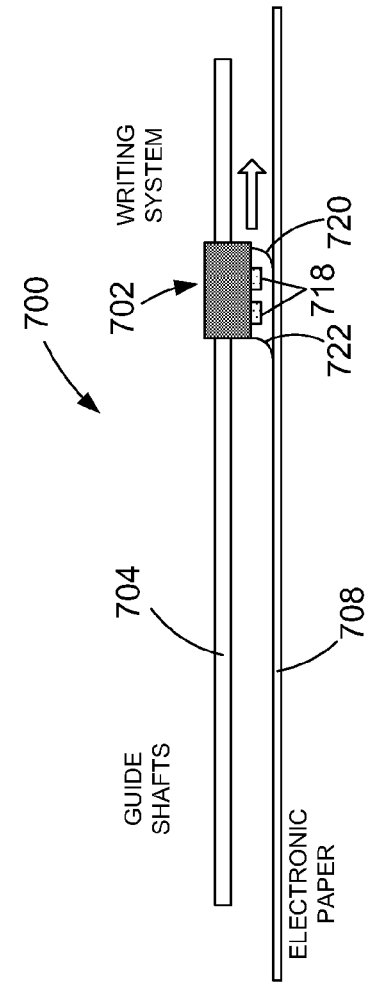
Figure 7B:
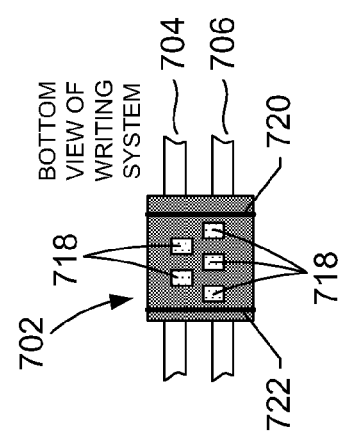

FIG. 7B shows a bottom view of the example writing system 702 revealing the writing system 702 is composed of a staggered arrangement of five separate ion heads 718 used to write information into the e-paper 708 as described above with reference to FIGS. 3-5. The writing system 702 also includes an erasing unit 720, as described above with reference to FIGS. 3 and 4, and includes a discharging unit 722, as described above with reference to FIG. 4.

FIG. 7C shows a cross-sectional view of the printing system 700 in operation along a line B-B, shown in FIG. 7A. The writing system 702 is moved along the shafts 704 and 706 as the erasing unit 720, ion heads 718, and discharging unit 722 are operated to write information into the e-paper 708, as described above with reference to FIGS. 3-4. In other embodiments, the erasing unit can be a corona, as described above with reference to FIG. 5.

FIG. 8A shows an isometric view of an example printing system 800. The printing system 800 includes a writing system 802 attached to a guide 804, both of which extend the width of e-paper 806. The writing system 802 is oriented with the erasing unit, ion heads, and discharging unit pointed toward e-paper 806. The writing system 802 is configured to write information to the e-paper 806 in a single pass. In certain embodiments, the e-paper 806 passes under the writing system 802 using a printer carriage (not shown) as indicated by directional arrow 808. In other embodiments, the e-paper 806 can be held stationary while the writing system 802 is moved back and forth using a mechanized platform connected to the guide 804, as indicated by directional arrow 810.

FIG. 8B shows a bottom view of the example writing system 802 revealing the writing system 802 composed of an arrangement of separate ion heads 812 that extend the length of the writing system 802. The arrangement of ion head 812 write information into the e-paper 806 in a single pass, as described above with reference to FIGS. 3-5. The writing system 802 also includes an erasing unit 814, as described above with reference to FIGS. 3 and 4, and includes a discharging unit 816, as described above with reference to FIG. 4.

FIG. 8C shows a cross-sectional view of the printing system 800 in operation along a line C-C, shown in FIG. 8A. As the writing system 802 moves along the e-paper 806, the erasing unit 814, ion heads 812, and discharging unit 816 write information into the e-paper 806 as described above with reference to FIGS. 3-4. In other embodiments, the erasing unit can be a corona, as described above with reference to FIG. 5.

Figure 8D:
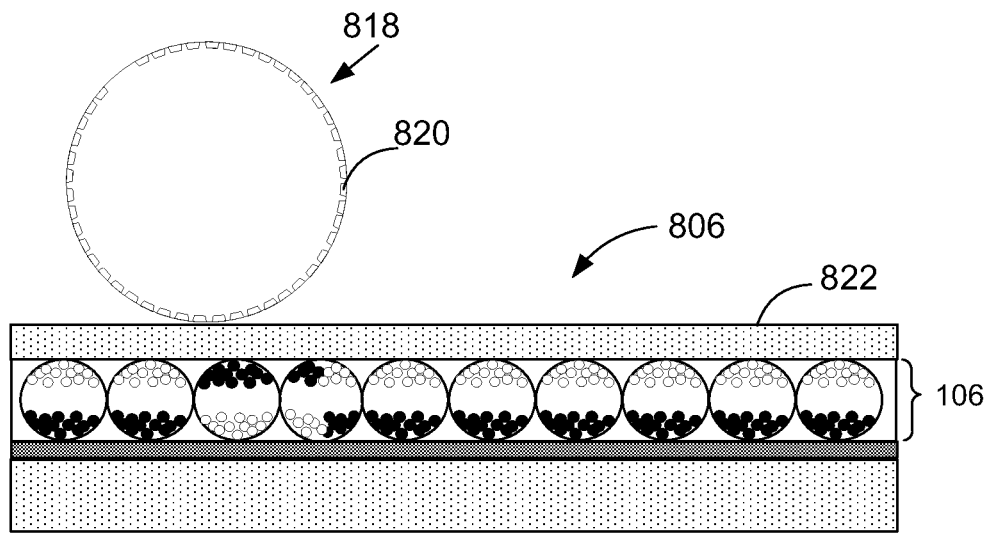
FIGS. 8D-8E show a schematic view of an example of a writing module of a printing system.
Figure 8E:
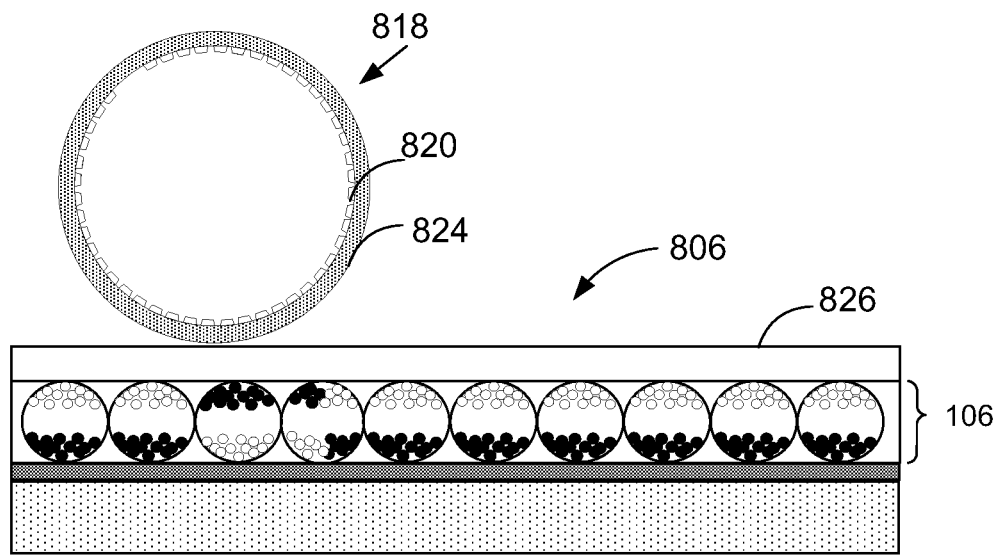

Examples of printing system and writing systems comprising ion heads or array of electrodes as mechanisms to write on e-paper have been illustrated in the foregoing description. Although these examples depict the writing modules comprising array of electrodes as a rectangular bock, other examples are also possible. FIGS. 8D and 8E illustrate a schematic of a writing module 818 that is drum shaped. The drum-shaped writing module 818 comprises an array of electrodes 820 disposed circumferentially on its outer circumference. In a writing phase, the drum-shaped writing module 818 may be rolled, for example, by a motorized mechanism, on the surface of the e-paper 806. As the drum-shaped writing module 818 rotates, portions of the e-paper 806 come under the drum-shaped writing module 818 and the drum-shaped writing module 818 writes on these portions of the e-paper 806. In one example, the drum-shaped writing module 818 may be in the writing proximity of a portion of the e-paper 806 while writing on the e-paper 806. In another example, the drum-shaped writing module 818 may be in full contact with a portion of the e-paper 806 while writing on the e-paper 806.

FIG. 8D illustrates an implementation where the drum-shaped writing module 818 and a portion of the e-paper 806 are in full contact for contact based writing. In such implementations, to allow improved contact in the writing phase, the e-paper 806 may be provided with an integrated compliant layer 822. Alternatively or additionally, compliant mechanisms, may also be provided on the drum-shaped writing module 818. For example, the electrodes in the circumferential array of electrodes 820 may be provided with spring devices.

In some examples, to enable contact between the circumferential array of electrodes 820 and the e-paper 806, as shown in FIG. 8E, a circumferential compliant layer 824 may be attached to the outer circumferential periphery of the drum-shaped writing module 818. As explained previously, compliant layers provide for improved contact in the writing phase in contact based writing. In examples where the circumferential compliant layer 824 is provided on the drum-shaped writing module 818, the e-papers 806 may be provided with the integrated compliant layer 822 or the integrated compliant layer 822 may be replaced by a protective layer 826. The protective layer 826 may be a thin layer of dielectric or conductive material, superposed on the microcapsule layer 106 to protect the microcapsule layer 106. The printing systems described above enable e-paper to be implemented in a variety of different non-electronic-based display platforms. For example, the paper 708 and 806 can be used in a variety of different media, including posters, general signage, pricing labels, e-books. In other embodiments, the display platform can be a card configured with one or more e-paper strips. The cards can be composed of a polyester, a plastic, or transparent Mylar in order to provide a substrate for the one or more e-paper strips, as described above with reference to FIGS. 1-2.

Figure 9A:
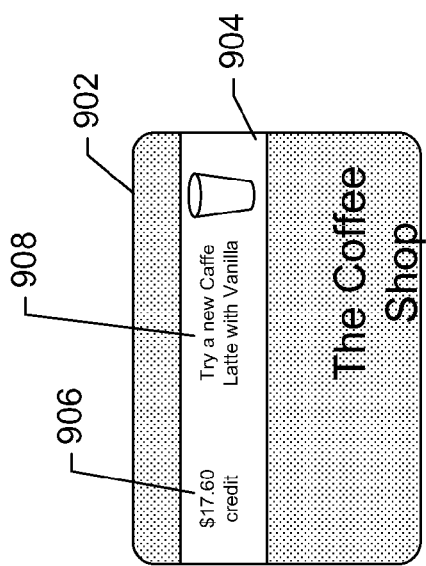
FIGS. 9A-9B show examples of cards configured with a strip of e-paper for displaying information in accordance with one or more embodiments of the present invention.
Figure 9B:
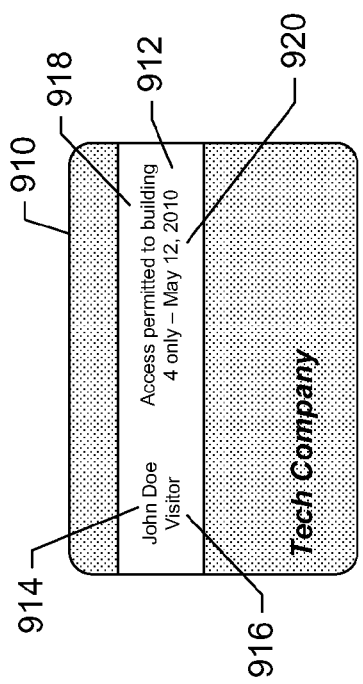

FIGS. 9A-9B show just two examples of cards, each card configured with a strip of e-paper for displaying information. In the example of FIG. 9A, a card 902 can be a gift card or a card issued to customers of a business, such as a department store. The card 902 includes an e-paper strip 904 and may include barcode or magnetic strip located on the back of the card (not shown), which is read by an electronic card machine. The card 902 can be issued value when the card 902 is sold to a customer. This value can be stored on the card magnetic strip and/or stored in the business's database, which is linked to the card 902 identification number. When the card 902 is issued and/or used, the amount can also be written on the e-paper strip 904. For example, as shown in FIG. 9A, the card 902 is sold by a business called "The Coffee Shop." When the customer uses the card 902 to complete a transaction at The Coffee Shop, the amount on the card is debited accordingly and the remaining amount of credit available 906 on the card is stored in the business's database and is written to the e-paper strip 904. In this way the customer does not have to remember the amount available on the card after each purchase. Instead, the amount available on the card is displayed on the e-paper strip 904 after each purchase. As shown in the example of FIG. 9A, the e-paper strip 904 can also be used to display advertisements 908 or any other information.

In the example of FIG. 9B, a card 910 can be a security card issued by a company or a government agency that wants to limit a visitor's access to certain buildings or departments. The card 910 includes an e-paper strip 912. When the card is issued to the wearer, the wearer's name and any other relevant information can be written on the e-paper strip 912, so that the wearer's access can be readily checked simply by reading the information displayed on the e-paper strip 912. For example, the e-paper strip 912 includes the wearer's name 914, identifies the wearer as a visitor 916, indicates which building 918 the wearer has access to, and the date 920 on which the wearer has access.

Display platforms are not intended to limited to the cards shown in FIGS. 9A-9B. The cards 902 and 910 are intended to represent just two of the many different kinds of uses for cards configured with one or more e-paper strips.

Figure 10:
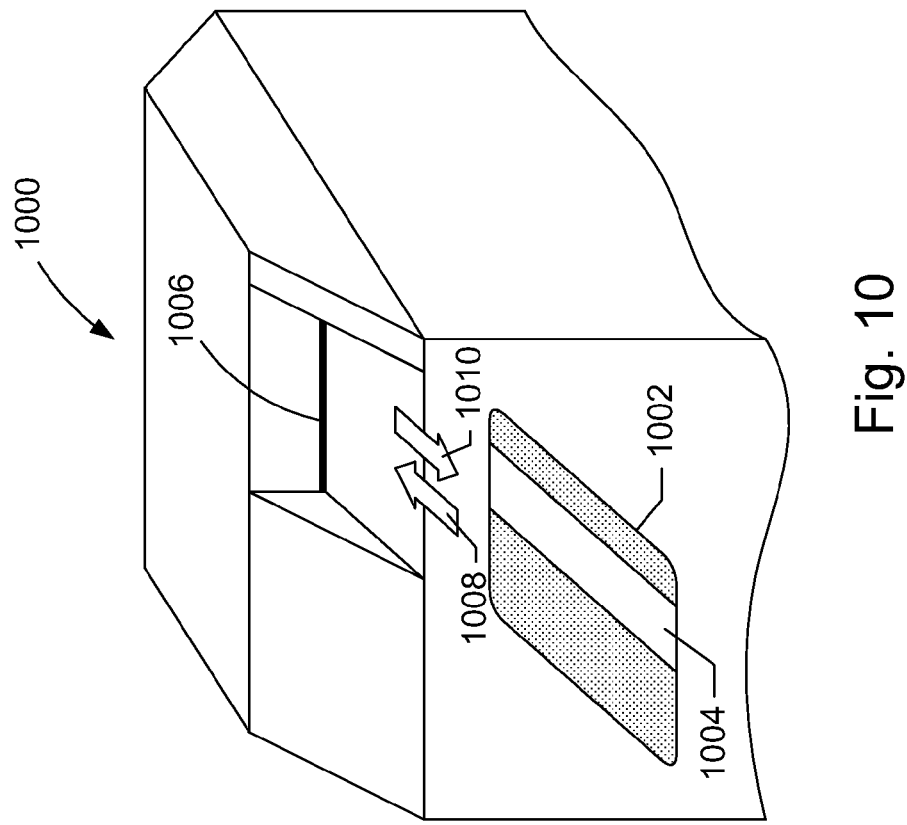
FIG. 10 shows an isometric view of an electronic paper writing machine and a card configured in accordance with one or more embodiments of the present invention.
Figure 11A:
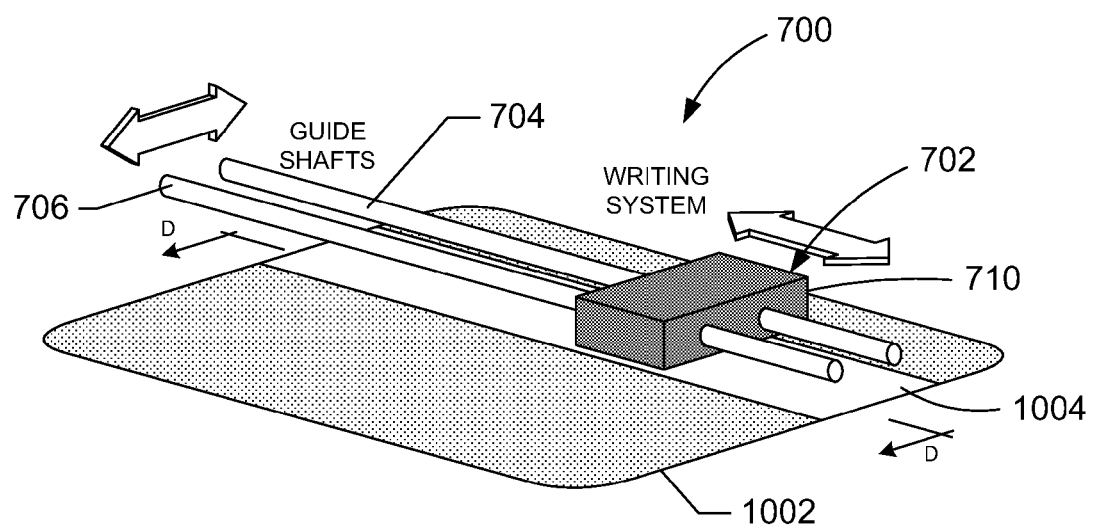
FIGS. 11A-11B show an example of the writing system configured to write information to electronic paper strip of a card in accordance with one or more embodiments of the present invention.
Figure 11B:
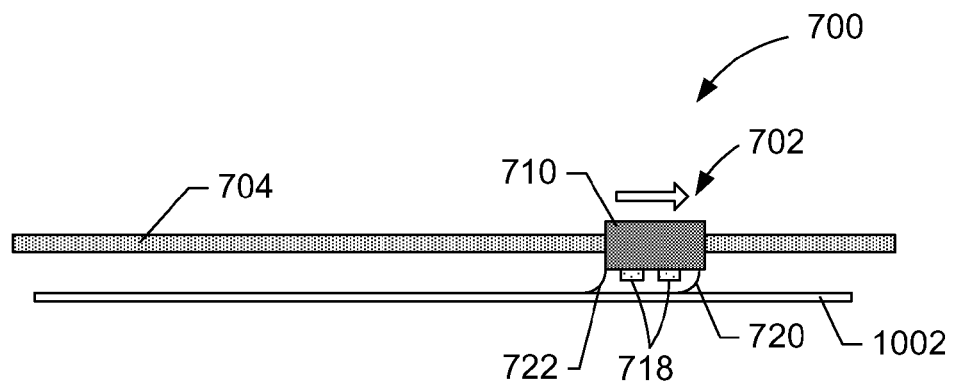

FIG. 10 shows an isometric view of an e-paper electronic writing machine 1000 and a card 1002 configured with a strip of e-paper 1004. The machine 1000 includes a slot 1006 for receiving 1008 and ejecting 1010 the card 1002. The e-paper strip 1004 can be used to display a variety of different types of written messages, as well as, images that can be read by the card holder. The machine 1000 includes a writing system, such as the writing systems 700 and 800. FIGS. 11A-11B show an example of the writing system 700 operated to write information to the e-paper strip 1004 of the card 1002 inserted into the machine 1000. The writing system 700 can be operated to write information to the e-paper strip as described above with reference to FIG. 7. When the writing system 700 has completed writing information to the e-paper strip 1004, the card 1002 is ejected from the machine 1000.

Figure 12:
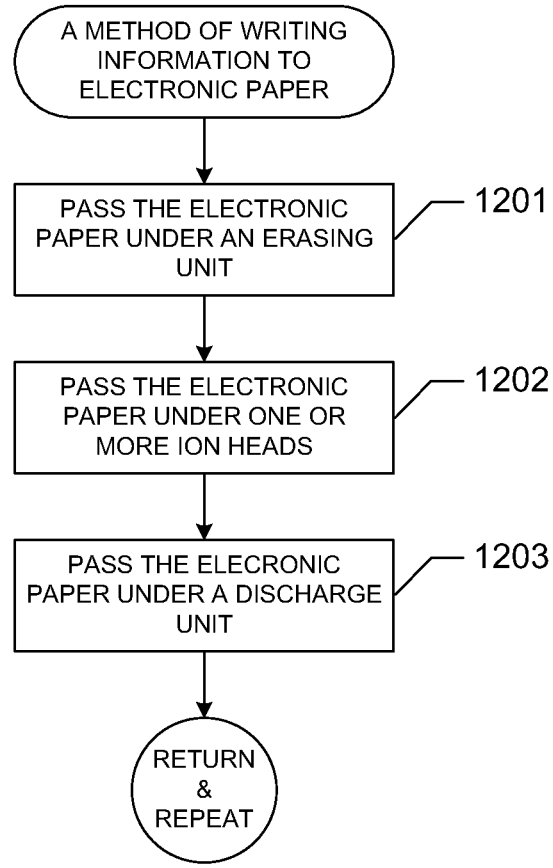
FIG. 12 shows a flow diagram of a method of writing information to electronic paper in accordance with one or more embodiments of the present invention.

FIG. 12 shows a flow diagram of a method of writing information to electronic paper. In step 1201, the electronic paper is passed under an erasing unit, which is configured to remove information stored in the electronic paper as described above with reference to FIGS. 3 and 5. In step 1202, the electronic paper is passed under one or more ion heads, which are configured to write information to the electronic paper as described above with reference to FIG. 3. In step 1203, the electronic paper is passed under a discharge unit configured to remove ions attached the surface of the electronic paper, as described above with reference to FIG. 4.

Figure 13:
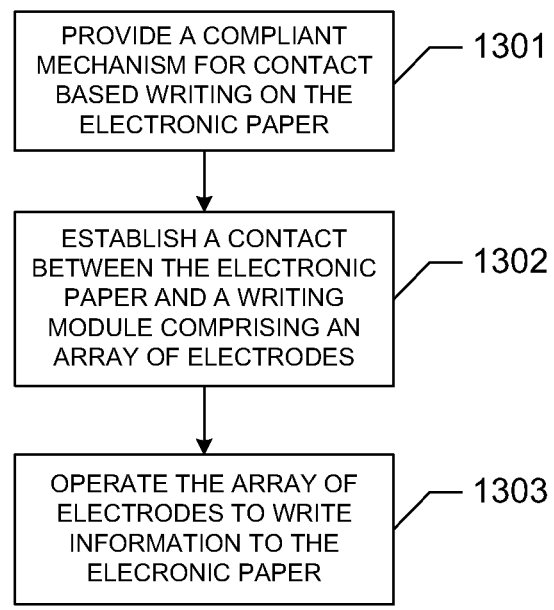
FIG. 13 shows an example flow diagram of a method of writing information to electronic paper.

FIG. 13 shows an example flow diagram of a method of writing information to electronic paper. The electronic paper, in one example, may be the e-paper as described in accordance with the foregoing embodiments. Likewise, the writing module may include any mechanism to write on electronic paper, such as the writing module described above.

In step 1301, a compliant mechanism is provided to enable better contact of the electronic paper with the writing module for contact based writing. In one implementation, the compliant mechanism may be provided on the writing module. For example, a compliant layer may be coupled to the array of electrodes. In one implementation, the compliant mechanism may be provided on the electronic paper. For example, to provide better contact of the electronic paper with the writing module, a top layer of the electronic paper may be a compliant layer.

In step 1302, a contact is established between the electronic paper and the writing module having the array of electrodes. In an example, a full contact is established between the electronic paper and the writing module through the compliant layer. In other words, the compliant layer acts as an intermediate layer between the electronic paper and the writing module.

In step 1303, the writing module operates the array of electrodes to selectively apply electrical voltage signal to one or more electrodes of the array of electrodes. Charges, corresponding to the electrical voltage signal, get applied to the electronic paper causing redistribution of the charged pigments in the microcapsule layer of the electronic paper. As described earlier, the redistribution of the charged pigments results in display of visual information on the e-paper.

In one example, prior to writing the information on to the electronic paper, the electronic paper is passed under an erasing unit, which is configured to erase information that may have been previously stored in the electronic paper. In one example, the array of electrodes may be configured to operate as the erasing unit. Accordingly, an appropriate electrical voltage signal may be applied to the array of electrodes to erase the information stored in the electronic paper. It will be appreciated that, even for the erasing, the contact between the electronic paper with the writing module may be established through the compliant layer. The compliant layer may thus also provides for effective erasing of the previously stored information since the electrical voltage for erasing the previously stored information is applied more efficiently.

The order in which the methods of FIG. 12 and FIG. 13 are described are not intended to be construed as a limitation, and any number of the described method blocks can be combined in any order to implement the methods, or alternative methods. Additionally, individual blocks may be deleted from the methods without departing from the spirit and scope of the subject matter described herein. Furthermore, the methods can be implemented in any suitable hardware, software, or combination thereof. The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A system for writing information on an electronic paper comprising:
    a writing module comprising an array of electrodes including leading erase electrodes and lagging write electrodes, wherein the writing module, as the electronic paper is moved in relation to the writing module, is to operate the erase electrodes to erase information previously written on the electronic paper and then is to selectively operate the write electrodes to write new information on the electronic paper;
    a compliant mechanism coupled to the writing module to establish a contact of the writing module with the electronic paper; and
    a guide shaft to which the writing module is slidably coupled, the writing module to move along a first axis over the electronic paper, the guide shaft movable along a second axis perpendicular to the first shaft.

2. The system as claimed in claim 1, wherein the compliant mechanism comprises a compliant layer attached to the array of electrodes, the compliant layer made of a compliant material having a Durometer in a range of 10-40 shore A.

3. The system as claimed in claim 2, wherein the compliant material has a conductivity of $10^7$-$10^9$ ohm cm.

4. The system as claimed in claim 2, wherein the compliant material has a dielectric constant between 3 and 10.

5. The system as claimed in claim 1, wherein the compliant mechanism comprises a compliant layer attached to the array of electrodes, and wherein the compliant layer is a gel layer.

6. The system as claimed in claim 1, wherein the compliant mechanism comprises a spring device coupled to the array of electrodes.

7. The system as claimed in claim 1, wherein the writing module is drum shaped with the array of electrodes disposed circumferentially on the circumference of the writing module and wherein a compliant layer is attached to the outer circumferential periphery of the writing module.

8. A system comprising:
    an electronic paper device comprising:
        a conductive ground layer;
        a compliant layer electrically coupled to the conductive ground layer; and
        a layer of microcapsules interposed between the conductive ground layer and the compliant layer, the layer of microcapsules comprising a plurality of charged pigments;
    a writing module comprising an array of electrodes including leading erase electrodes and lagging write electrodes, wherein the writing module, as the electronic paper is moved in relation to the writing module, is to operate the erase electrodes to erase information previously written on the electronic paper and then is to selectively operate the write electrodes to write new information on the electronic paper; and
    a guide shaft to which the writing module is slidably coupled, the writing module to move along a first axis over the electronic paper, the guide shaft movable along a second axis perpendicular to the first shaft.

9. The system as claimed in claim 8, wherein the compliant layer has a Durometer in a range of 10-40 shore A and wherein the compliant layer has a thickness of 10-100 microns.

10. The system as claimed in claim 8, wherein the compliant layer has a conductivity of $10^7$-$10^9$ ohm cm.

11. The system as claimed in claim 8, wherein the compliant layer has a dielectric constant of 3 to 10.

12. The system as claimed in claim 8, wherein the compliant layer is transparent.

* * * * *

UNITED STATES PATENT AND TRADEMARK OFFICE
CERTIFICATE OF CORRECTION

PATENT NO. : 9,846,493 B2  
APPLICATION NO. : 14/219725  
DATED : December 19, 2017  
INVENTOR(S) : Omer Gila et al.

Page 1 of 1

It is certified that error appears in the above-identified patent and that said Letters Patent is hereby corrected as shown below:

In the Drawings

In sheet 18 of 19, reference numeral 1203, Line 1, delete "ELECRONIC" and insert -- ELECTRONIC --, therefor.

Signed and Sealed this  
Third Day of April, 2018

Andrei Iancu  
*Director of the United States Patent and Trademark Office*